United States Patent
Iwayama et al.

(10) Patent No.: US 7,810,838 B2
(45) Date of Patent: Oct. 12, 2010

(54) INTERIOR STRUCTURE OF VEHICLE EQUIPPED WITH CURTAIN AIRBAG DEVICE

(75) Inventors: Yukio Iwayama, Hiroshima (JP); Ikuko Onishi, Hiroshima (JP)

(73) Assignee: Mazda Motor Corporation (JP)

( * ) Notice: Subject to any disclaimer, the term of this patent is extended or adjusted under 35 U.S.C. 154(b) by 360 days.

(21) Appl. No.: 11/940,567

(22) Filed: Nov. 15, 2007

(65) Prior Publication Data
US 2008/0122206 A1   May 29, 2008

(30) Foreign Application Priority Data
Nov. 24, 2006 (JP) ............... 2006-316987
Nov. 24, 2006 (JP) ............... 2006-316988

(51) Int. Cl.
B60R 21/16 (2006.01)

(52) U.S. Cl. ............... 280/730.2; 280/743.1; 280/743.2

(58) Field of Classification Search ............... 280/730.2, 280/730.1, 743.1, 743.2
See application file for complete search history.

(56) References Cited

U.S. PATENT DOCUMENTS

| | | | |
|---|---|---|---|
| 6,530,594 B1 * | 3/2003 | Nakajima et al. | 280/730.2 |
| 6,672,027 B2 * | 1/2004 | Mizutani et al. | 52/716.5 |
| 6,705,636 B2 * | 3/2004 | Takahara | 280/728.2 |
| 6,893,042 B1 | 5/2005 | Ponceau et al. | |
| 6,942,241 B2 * | 9/2005 | Yamamura et al. | 280/728.2 |
| 6,974,152 B2 * | 12/2005 | Hanjono | 280/728.3 |
| 7,172,211 B2 * | 2/2007 | Hirose | 280/730.2 |
| 7,188,863 B2 * | 3/2007 | Tiesler et al. | 280/730.2 |
| 2002/0140211 A1 | 10/2002 | Takahara | |

FOREIGN PATENT DOCUMENTS

| | | |
|---|---|---|
| DE | 102004028513 A1 | 12/2005 |
| EP | 0904992 A | 3/1999 |
| JP | 2002-059802 | 2/2002 |
| JP | 2002059802 A | 2/2002 |
| JP | 2005-313674 | 11/2005 |

OTHER PUBLICATIONS

European Search Report dated Apr. 6, 2009; Application No. / Patent No. 07021482.0-1264 / 1925510.

* cited by examiner

*Primary Examiner*—Toan C To
(74) *Attorney, Agent, or Firm*—Studebaker & Brackett PC; Donald R. Studebaker

(57) ABSTRACT

There is provided a restricting portion to restrict a movement of a roof trim at an upper end portion of a pillar trim behind the roof trim. Accordingly, there can be provided a structure that can properly restrain the roof trim from being deformed, for example, even if the passenger inadvertently pushes the roof trim toward a vehicle outside.

15 Claims, 25 Drawing Sheets

INTERIOR STRUCTURE OF VEHICLE EQUIPPED WITH CURTAIN AIRBAG DEVICE

BACKGROUND OF THE INVENTION

The present invention relates to an interior structure of a vehicle equipped with a curtain airbag device.

In general, vehicles, particularly automotive vehicles, are equipped with an airbag device to protect passengers from accidents, such as a vehicle crash, or a vehicle overturn. A so-called curtain airbag is known as such an airbag, which is operative to inflate so as to cover an inner face of a side window portion including plural side window glasses and pillars.

The curtain airbag is accommodated in a portion of a roof side portion that is located above a side end portion of a roof trim, and operative to inflate out of a boundary between a pillar trim and a roof trim, pushing the side end portion of the pillar trim toward a vehicle compartment side.

Herein, there is provided a guide portion that is formed integrally with an upper end portion of the pillar trim so as to guide the curtain airbag inflating toward the vehicle compartment side in order to provide a smooth inflation of the curtain airbag into the vehicle compartment, which is disclosed in Japanese Patent Laid-Open Publication Nos. 2002-59802 or 2005-313674, for example.

The roof trim is generally made of a material that is softer than a material of a pillar trim. Herein, if the passenger inadvertently pushes the roof trim toward the vehicle outside, for example, the roof trim may he deformed, thereby deteriorating the smooth inflation of the curtain airbag. Accordingly, there is a concern that the smooth inflation of the curtain airbag may not be obtained even if the guide portion disclosed in the above-described patent documents is provided. There is also a problem in that good appearances of the interior may be deteriorated.

SUMMARY OF THE INVENTION

Accordingly, an object of the present invention is to provide an interior structure of a vehicle equipped with a curtain airbag device that can properly restrain a roof trim from being deformed, for example, even if the passenger inadvertently pushes the roof trim toward the vehicle outside.

According to the present invention, there is provided an interior structure of a vehicle equipped with a curtain airbag device, comprising a pillar trim, a roof trim, a curtain airbag operative to inflate out of a boundary between the pillar trim and the roof trim so as to cover a window of the vehicle when a specified requirement is met, and a restricting portion provided at an upper end portion of the pillar trim behind the roof trim so as to restrict a movement of the roof trim.

According to the present invention, since at the upper end of the pillar trim is provided the restricting portion to restrict the movement of the roof trim, even if a passenger inadvertently pushes the roof trim toward the vehicle outside, the roof trim contacts with the restricting portion. Accordingly, the roof trim can be restrained from being deformed further, thereby preventing deterioration of appearances of the roof trim and the improper influence to the inflation of the curtain airbag.

According to an embodiment of the present embodiment, near the boundary at an upper end portion of a body portion of the pillar trim is provided a guide portion operative to guide the airbag inflating toward a vehicle compartment side, below a vehicle-compartment-side end portion of the guide portion is provided an engagement portion to accept a side end portion of the roof trim for engagement, whose engagement with the side end portion of the roof trim being releasable when the airbag inflates, and the restricting portion is provided so as to extend from the guide portion or the engagement portion. Thereby, since the guide portion to guide the airbag inflating, toward the vehicle compartment side is provided above the body portion of the pillar trim, the inflation of the airbag can he properly guided. Also, since at the lower portion of the guide portion is provided the engagement portion that is operative to engage with the side end portion of the roof trim and this engagement is releasable for the inflation of the curtain airbag, the side end portion of the roof trim can be covered with the engagement portion so as to provide the good appearance when the airbag is in the non-inflation state, while the smooth inflation of the airbag can be provided when the airbag inflates. Further, since the restricting portion is formed to extend from the guide portion or the engagement portion, the structure can be made simple.

According to another embodiment of the present embodiment, the restricting portion is provided so as to project beyond a periphery of a notch portion that is formed at the roof trim when the pillar trim is attached to a vehicle body in such a manner that the upper end potion of the pillar trim is covered, and an amount of projection of the restring portion toward the vehicle compartment side is reducible. Thereby, since the restricting portion is provided so as to project beyond the periphery of the notch portion that is formed at the roof trim when the pillar trim is attached to the vehicle body in such a manner that the upper end potion of the pillar trim is covered, even if the passenger inadvertently pushes the roof trim toward the vehicle outside, the roof trim contacts with the restricting portion. As a result, the same effects as those of the above-described present invention can be obtained Further, since the amount of projection of the restring portion toward the vehicle compartment side is reducible, the pillar trim can be properly attached to the pillar after attaching the roof trim to the roof with the extending portion engaging the notch portion of the roof trim, without damaging the periphery of the notch portion.

According to another embodiment of the present embodiment, the restricting portion comprises an upright portion that extends upward from the upper portion of a body portion of the pillar trim and a slant portion that extends obliquely downward from an upper end of the upright portion beyond a periphery of a notch portion that is formed at the roof trim. Thereby, the restricting portion can be simply comprised of the above-described upright portion and the slant portion, and the inflation of the airbag may not be deteriorated.

According to another embodiment of the present embodiment, the slant portion is configured to be longitudinally rotatable around an upper end thereof, and the roof trim is positioned outside a rotational locus of the slant portion. Thereby, when the slant portion rotates (swings) at the inflation of the airbag, it can be prevented from contacting the roof trim, and the roof trim can be prevented from being stuck between the slant portion and the upright portion. Thus, the inflation of the airbag does not deteriorate even if the restricting portion is provided.

According to another embodiment of the present embodiment, the restricting portion is formed at the guide portion to be slant downward such that the guide portion can guide the airbag toward the vehicle compartment side. Thereby, the restricting portion can be made simple, and the inflation of the airbag can be improved.

According to another embodiment of the present embodiment, the restricting portion comprises an upright portion that extends obliquely upward from the upper end portion of the body portion of the pillar trim beyond the notch portion substantially along the side end portion of the roof trim and a slant portion that extends obliquely upward from an upper end of the upright portion. Thereby, the restricting portion can be made simple, and the side end portion of the roof trim can be supported properly.

According to another embodiment of the present embodiment, a plurality of restricting portions are provided at front and rear sides of the upper end portion of the body portion of the pillar trim. The same operation and effects that are described above can be obtained.

According to another embodiment of the present embodiment, near the boundary at an upper end portion of a body portion of the pillar trim is provided a guide portion operative to guide the airbag inflating toward a vehicle compartment side, and the guide portion is provided behind the roof trim such that a vehicle-compartment-side end portion thereof is located close to the roof trim. Thereby, since the guide portion is provided behind the roof trim such that its vehicle-compartment-side end portion is located close to the roof trim, even if the passenger inadvertently pushes the roof trim toward the vehicle outside, the roof trim contacts with the restricting portion. Accordingly, the roof trim can be restrained from being deformed further, thereby preventing deterioration of appearances of the roof trim and the improper influence to the inflation of the curtain airbag. Herein, the above-described "being located close to the roof trim" includes "being located to contact the roof trim."

According to another embodiment of the present embodiment, below a vehicle-compartment-side end portion of the guide portion at the pillar trim is provided an engagement portion to accept a side end portion of the roof trim for engagement, whose engagement with the side end portion of the roof trim being releasable when the airbag inflates. Thereby, the side end portion of the roof trim can be covered with the engagement portion so as to provide the good appearance when the airbag is in the non-inflation state, while the smooth inflation of the airbag can be provided when the airbag inflates.

According to another embodiment of the present embodiment, the guide portion is provided above the body portion of the pillar trim via a connecting portion that is configured to fall down toward the vehicle compartment side such that the guide portion moves toward the vehicle compartment side when the airbag inflates. Thereby, the end side portion of the roof trim is pressed toward the vehicle compartment side by the vehicle-compartment-side end portion of the guide portion.

According to another embodiment of the present embodiment, the engagement portion includes a groove that is formed with an upper opening thereof to extend along an upper edge of the body portion of the pillar trim for the engagement with the side end portion of the roof trim, and an outside groove wall of the engagement portion is formed by a lower portion of the connecting portion. Thereby, since the engagement portion includes the groove that is formed with the upper opening thereof to extend along the upper edge of the body portion of the pillar trim, the releasing of the engagement with the side end portion of the roof trim can be facilitated. Accordingly, a burden of the curtain airbag to push the roof trim toward the vehicle-compartment side at the inflation of the airbag can be properly reduced, thereby improving the airbag inflation. Also, since the outside groove wall of the engagement portion is formed by the lower portion of the connecting portion, the upper structure of the pillar trim can be made properly simple.

According to another embodiment of the present embodiment, the connecting portion is configured such that a vehicle-compartment-side end portion of the guide portion is away from an upper end of a vehicle-compartment-side wall portion of the groove of the engagement portion even when the guide portion is moved toward the vehicle compartment side. Thereby, the side end portion of the roof trim can be prevented from being stuck between the vehicle-compartment-side end portion of the guide portion and the upper end of the vehicle-compartment-side wall portion of the groove of the engagement portion when the curtain airbag inflates. Namely, the inflation of the airbag does not deteriorate.

According to another embodiment of the present embodiment, the vehicle-compartment-side end portion of the guide portion is located inward from a vehicle-compartment-side end of the engagement portion. Thereby, the side end portion of the roof trim can be supported properly.

According to another embodiment of the present embodiment, the vehicle-compartment-side end portion of the guide portion has an extending portion that extends toward the vehicle compartment side. Thereby, the side end portion of the roof trim is supported at one point of a tip of the extending portion. Thereby, the slide resistance between the vehicle-compartment-side end portion of the guide portion and the roof trim when the curtain airbag inflates is reduced. Thus, the roof trim can be easily pushed toward the vehicle compartment side, thereby providing the smooth inflation of the airbag.

According to another embodiment of the present embodiment, the pillar trim is configured to be attached to an inner face of a vehicle body by being made slide upward along the inner face, and a guide face of the guide portion is configured to be slant and have an angle of approximate 90 degrees or greater relative to the side end portion of the roof trim. Thereby, the side end portion of the roof trim can slide smoothly along the guide face of the guide portion, thereby improving the attachment of the pillar trim without generating any improper bending of the side end portion of the roof trim. Also, since the guide face of the guide portion is slant toward the vehicle compartment, the inflating airbag can be guided toward the passenger properly.

Other features, aspects, and advantages of the present invention will become apparent from the following description which refers to the accompanying drawings.

DETAINED DESCRIPTION OF THE INVENTION

Hereinafter, a preferred embodiment of the present invention and its modifications will be described. It should be understood that even though embodiment/modifications are separately described, single features thereof may be combined additional modifications.

Figure 1:
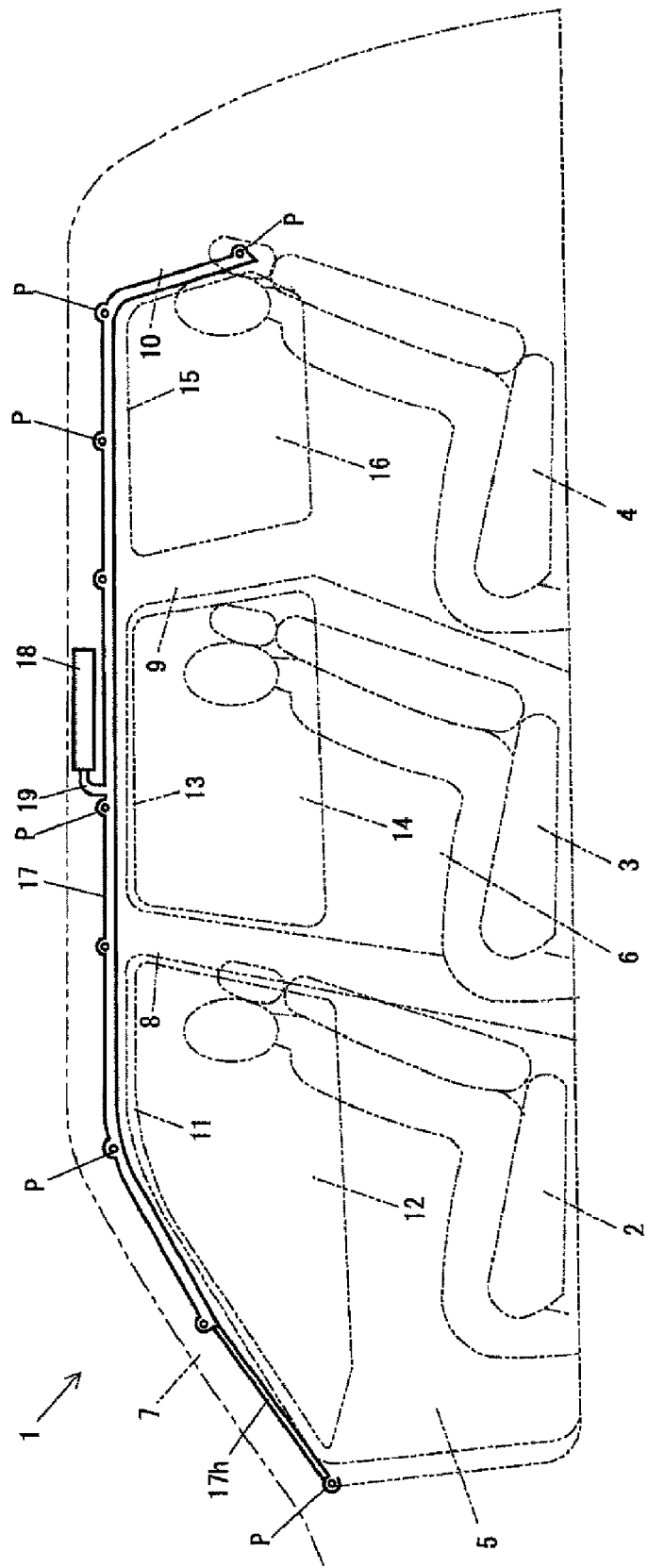
FIG. 1 is a schematic side view of a curtain airbag in a folded state, when viewed from a vehicle compartment side.

A vehicle 1 comprises a front seat 2, a second-row seat 3 behind the front seat 2, and a third-row seat 4 behind the second-row seat 3 as shown in FIG. 1. The vehicle 1 includes a side door 5 for the front seat 2 and a side door 6a for the second-row seat 3 as side doors for ingress and egress, and pillars of an A pillar 7, a B pillar 8, a C pillar 9 and a D pillar 10, which are provided in order from the front.

The side door 5 opens or closes an opening 11 for the ingress and egress between the A and B pillars 7, 8, which has a side window glass 12 that is movable vertically. The side door 6 opens or closes an opening 13 for ingress and egress between the B and C pillars 8, 9, which has a side window glass 14 that is movable vertically. A rear side opening 15 is formed between the C and D pillars 9, 10, which is covered with a side window glass 16.

There is provided at the vehicle 1 a curtain airbag 17 that is operative to inflate so as to cover an inner face of a vehicle inner side including the three side window glasses 12, 14, 16 at a vehicle side crash, a vehicle turnover, its prediction timing or the like. An inflator 18 operative to supply inflating gas to the curtain airbag 17 via a supply passage 19 is provided at an upper portion of the vehicle in front of the C pillar 9.

Figure 2:
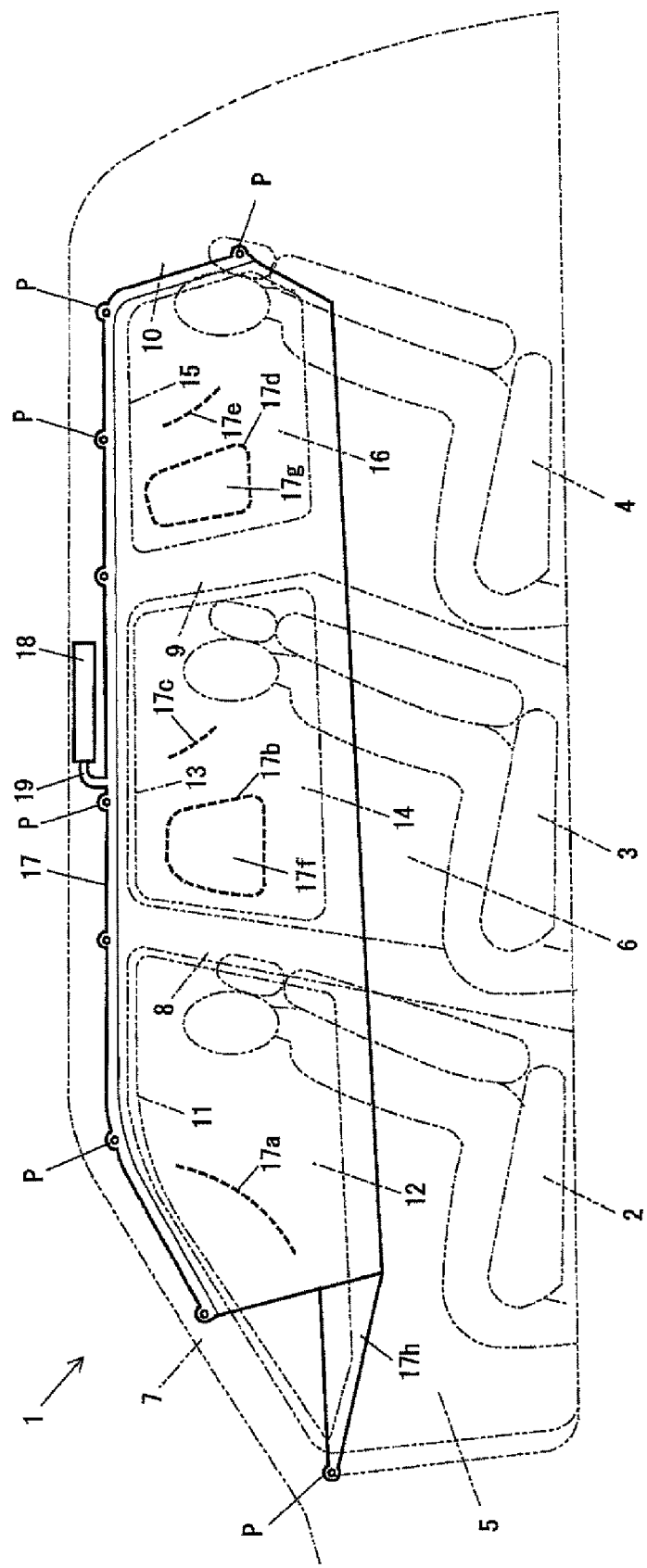
FIG. 2 is a schematic side view of the curtain airbag that has inflated in the vehicle compartment, which corresponds to FIG. 1.

The curtain airbag 17 is accommodated in an inner space that is formed extending from the A pillar 7 to the D pillar 10 by way of a roof side portion in a folded bar-shaped state, like a bellows shape or a roll shape, and it is fixed to a vehicle body via brackets or the like. The airbag 17 inflates into a vehicle compartment along inner faces of the side window glasses 12, 14, 16 so as to cover the these glasses 12, 14, 16 from a vehicle compartment side, as shown in FIG. 2. The size of the curtain airbag 17 is configured so that its lower end can be located slightly below a lower edge of each of the side window glasses 12, 14, 16 when it has inflated.

The curtain airbag 17 is formed in a bag shape by sewing two sheets of base clothes having similar shape at their peripheral portions, in which the gas can be supplied from the inflator 18 via a gas inlet formed on the airbag. The above-described two sheets of base clothes have some seams 17a-17e that have a curved shape or a closed loop shape. Herein, an area enclosed by the seam 17b or the seam 17d, into which no gas is supplied, forms a non-inflatable portion 17f or a non-inflatable portion 17g. The rest of part forms an inflatable portion into which the gas can be supplied. The non-inflatable portions 17f, 17g are located at positions properly away from each head of passengers seated in the seats 2-4. The forming of the non-inflatable portion can quicken the inflation of the curtain airbag 17. The seams 17a, 17c, 17e can strain the thickness of the inflating curtain airbag 17 in a vehicle width direction from becoming improperly wide. The non-inflatable portions 17f, 17g have also the same function as the seams 17a, 17c, 17e. A plurality of fixing points P . . . P are provided at an upper edge portion of the curtain airbag 17 along upper edges of the side window glasses 12, 14, 16. A tether 17h is formed at a front end portion of the curtain airbag 17, and this tether 17h is fixed to a lower portion of the A pillar 7.

Figure 3:
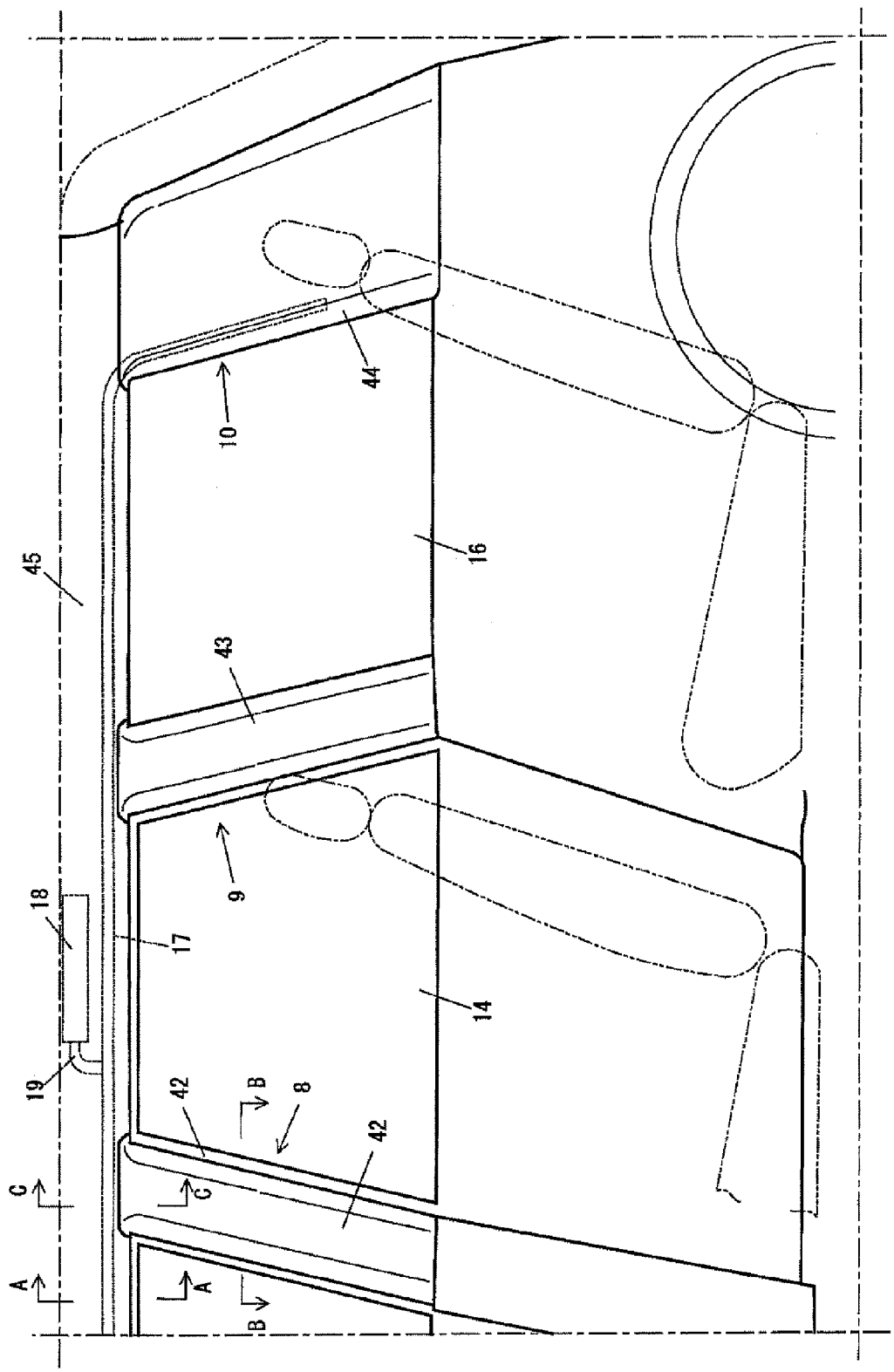
FIG. 3 is a view of a right-side rear part of a vehicle body, when viewed from the vehicle compartment side.

Each of the pillars 7-10 is covered with a pillar trim from the vehicle compartment side. For example, the B pillar 8 is covered with a B pillar trim 42, the C pillar 9 is covered with a C pillar trim 43, and the D pillar 10 is covered with a D pillar trim 44, as shown in FIG. 3. An inside of a roof panel 45 is covered with a roof trim 45, which is made of a soft material, such as a flexible material, for example, an urethane foam covered with clothes, which may be deformed easily with a relatively small external force by a finger pushing. The pillar trims are made of synthetic resin, for example, polypropylene, which is harder than the roof trim 45, which may not be easily deformed with the external force by the finger pushing.

Figure 4:
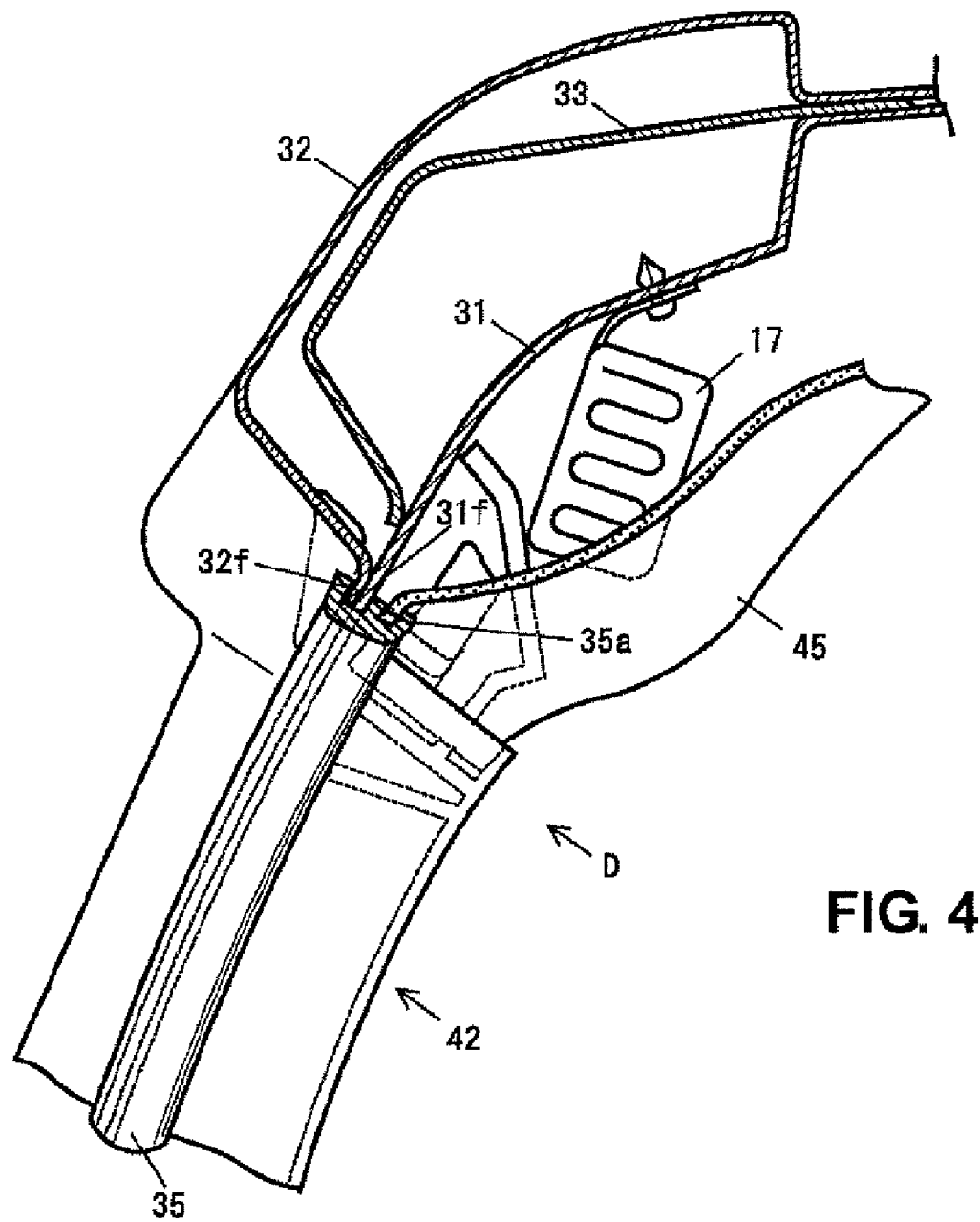
FIG. 4 is a sectional view of an embodiment taken along line A-A of FIG. 3 (illustration of side doors are omitted).
Figure 5:
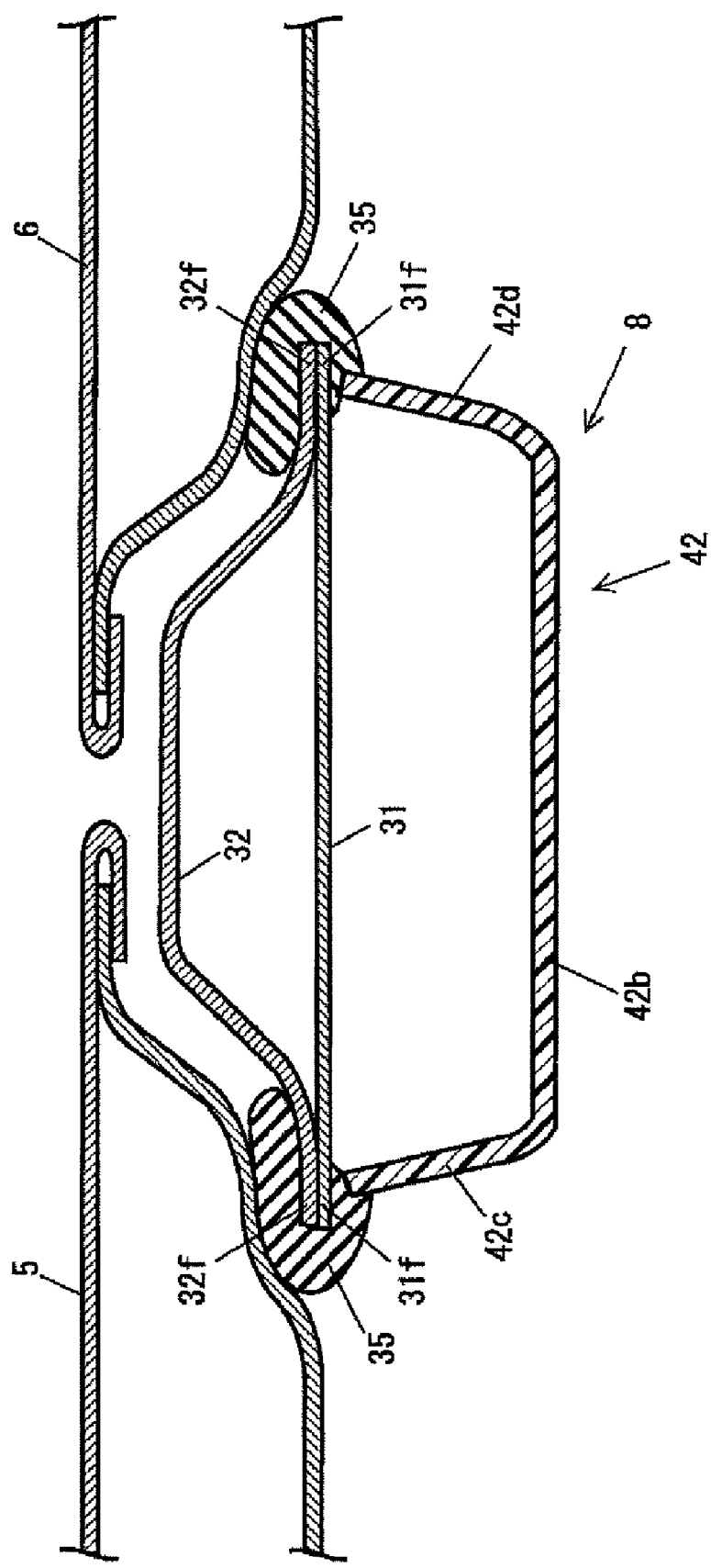
FIG. 5 is a sectional view of taken along line B-B of FIG. 3.

The side face portion of the vehicle comprises an inner panel 31 to form its inner face and an outer panel 32 to form its outer face. The panels 31, 32 have openings that respectively correspond to the above described ingress/egress openings 11, 13 and the side window 15. Flanges 31f, 32f that are formed at opening edges of the openings 11, 13 are connected to each other as shown in FIGS. 4 and 5. A weather strip 35 is fixed to a connecting portion of the flanges 31f, 32f.

Figure 6:
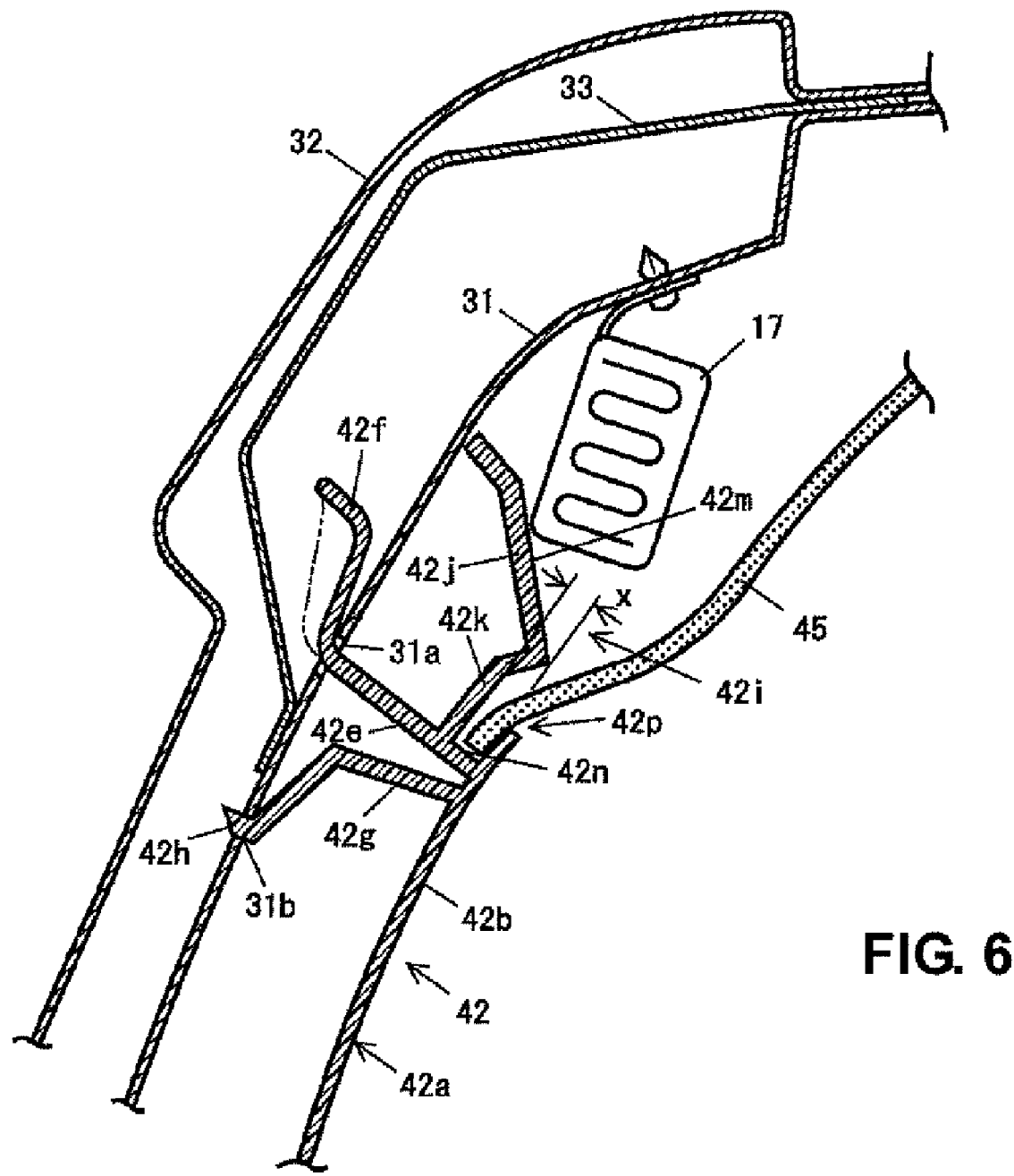
FIG. 6 is a sectional view of taken along line C-C of FIG. 3.

Vertically extending portions of the inner and outer panels 31, 32 that are located between the openings 11, 13 form a pillar body of the B pillar 8 that has a closed cross section with its connected front and rear ends, as shown in FIGS. 5 and 6. This pillar body of the B pillar 8 is covered with the B pillar trim 42 having a space therebetween.

Meanwhile, upper portions of the inner and outer panels 31, 32 that are located above the openings 11, 13, 15 form a roof side portion 30, which is formed so as to have respective closed cross sections with their connected upper and lower ends between the pillars 7, 8, the pillars 8, 9 and the pillars 9, 10, as shown in FIG. 4. Within a space of this longitudinally-extending roof side portion 30 is provided a roof side reinforcement 33 to reinforce the roof side portion 30. An inner end of the outer panel 32 is connected to a side end portion of a roof panel, not illustrated, that forms a ceiling outer face of the vehicle body.

At the roof side portion is provided the curtain airbag 17 that extends substantially longitudinally in a plan view, which is fixed to the inner panel 31 with fasteners, such as clips, that are inserted into a hole provided at the curtain airbag 17 and a hole formed at the inner panel 31.

The weather strip 35 includes a groove-shaped portion 35a at its portion that corresponds to the roof side portion 30. A portion of the side end portion of the roof trim 45, which is other than its portion that engages with the respective pillar trims, engages with the above-described groove portion 35a. Further, the weather strip 35 has groove portions at its portions that correspond to the respective pillar portions as shown in FIG. 5. The front face portion and the rear face portion of the pillar trim, which will be described below, engage with the above-described groove portions.

Next, the structure of the B pillar trim 42 and the support structure of the side end portion of the roof trim 45 will be described.

Figure 8:
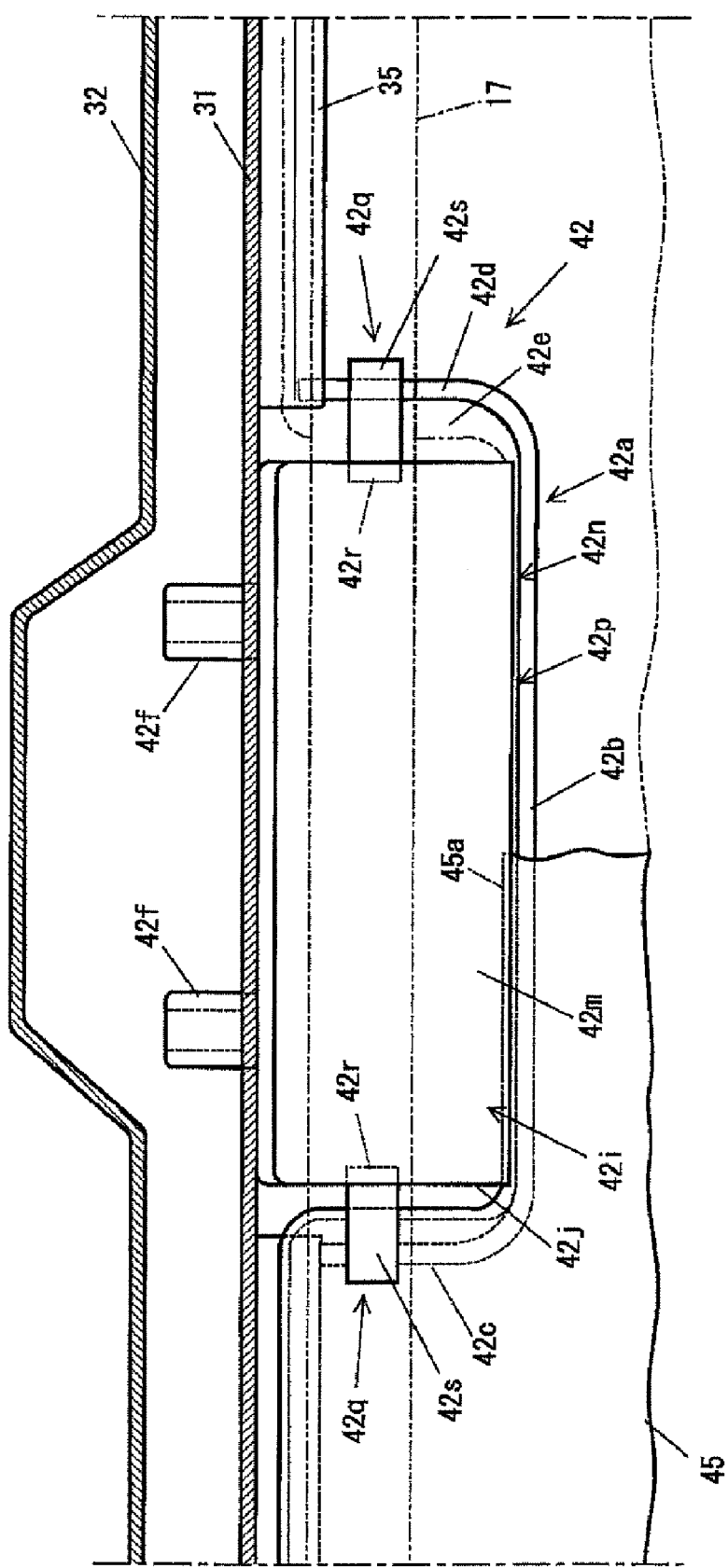
FIG. 8 is a sectional view of taken along line E-E of FIG. 7.

As shown in FIGS. 5 and 8, a body portion 42a of the B pillar trim 42 includes a side face portion 42b that is substantially parallel to the vehicle side face, a front face portion 42c that is located forward and a rear face portion 42d that is located rearward, which is formed in a curve shape in such a manner that its central portion protrudes toward the vehicle compartment side.

The B pillar trim 42 also, as shown in FIGS. 6-9, includes a cover-shaped portion 42e that extends so as to cover the above-described closed cross section from a position that is slightly below the upper end of the body portion 42a. The cover-shaped portion 42e has front and rear engaging leg portions 42f, 42f that are respectively formed at front and rear portions of its outside end portion. These engaging leg portions 42f, 42f are provided so as to be inserted, for engagement, into engagement holes 31a, 31a that are formed at the inner panel 31.

The B pillar trim 42 also includes a leg portion 42g for positioning that extends outward below the cover-shaped portion 42e. This positioning leg portion 42g is formed in a bending shape, and has an engaging projection 42h for positioning at its tip. This engaging projection 42h is provided so as to be inserted, for engagement, into an engagement hole 31b for positioning that is formed at the inner panel 31.

The B pillar trim 42 further includes an extending portion 42i that extends substantially upward near the airbag 17 from the cover-shaped portion 42e behind the roof trim 45. The extending portion 42i comprises a guide portion 42j that is formed above the body portion 42a of the pillar trim 42 so as to guide the airbag 17 inflating toward the vehicle compartment side and a connecting portion 42k that extends substantially vertically to interconnect the guide portion 42j and the above-described cover-shaped portion 42e.

The guide portion 42j (a guide face 42m) is configured to be inclined in such a manner that an extension line of the guide face 42m, namely an inflation direction of the curtain airbag 17 guided by the guide face 42m passes through over the upper end of the side face portion 42b of the body portion 42a as shown. Thereby, the side face portion 42b may not prevent the smooth inflation of the airbag 17.

The connecting portion 42k interconnects an inner-side end of the guide portion 42j and a portion of the cover-shaped portion 42e that is located slightly outward from the body portion 42a. Further, the connecting portion 42k is formed in a bending shape in such a manner that its lower portion extends substantially in parallel to an upper end portion (a portion located above the cover-shaped portion 42e) of the side face portion 42b as shown. Thus, a groove 42n is formed by the upper end portion of the body portion 42a, the vehicle-compartment-side portion of the cover-shaped portion 42e, and the lower portion of the connecting portion 42k. This groove 42n extends in a substantially longitudinal direction of the vehicle with its upper opening, which forms an engagement portion 42p to accept a side end portion of the roof trim 45 for engagement. Namely, an outside groove wall of the engagement portion 42p is formed by the lower portion of the connecting portion 42k.

The width of the groove 42n of the engagement portion 42p in the vehicle width direction is configured to be slightly greater than the thickness of the roof trim 45, so the side end portion of the roof trim 45 can be smoothly released upward of the groove 42n at the inflation of the airbag 17. Normally, the side end portion of the roof trim 45 is properly covered from the vehicle side by the engagement with the engagement portion 42p.

Herein, since the guide portion 42j is configured, as described above, such that the connecting portion 42k has the bending shape, the vehicle-compartment-side end portion of the guide portion 42j is offset inwardly from an inner end of the lower potion of the connecting portion 42k. That is, the vehicle-compartment-side end portion of the guide portion 42j is located near the side end portion of the roof trim 45 behind the roof trim 45. Also, the vehicle-compartment-side end portion of the guide portion 42j is located inward from a vehicle-compartment-side end of the engagement portion 42p.

Figure 10:
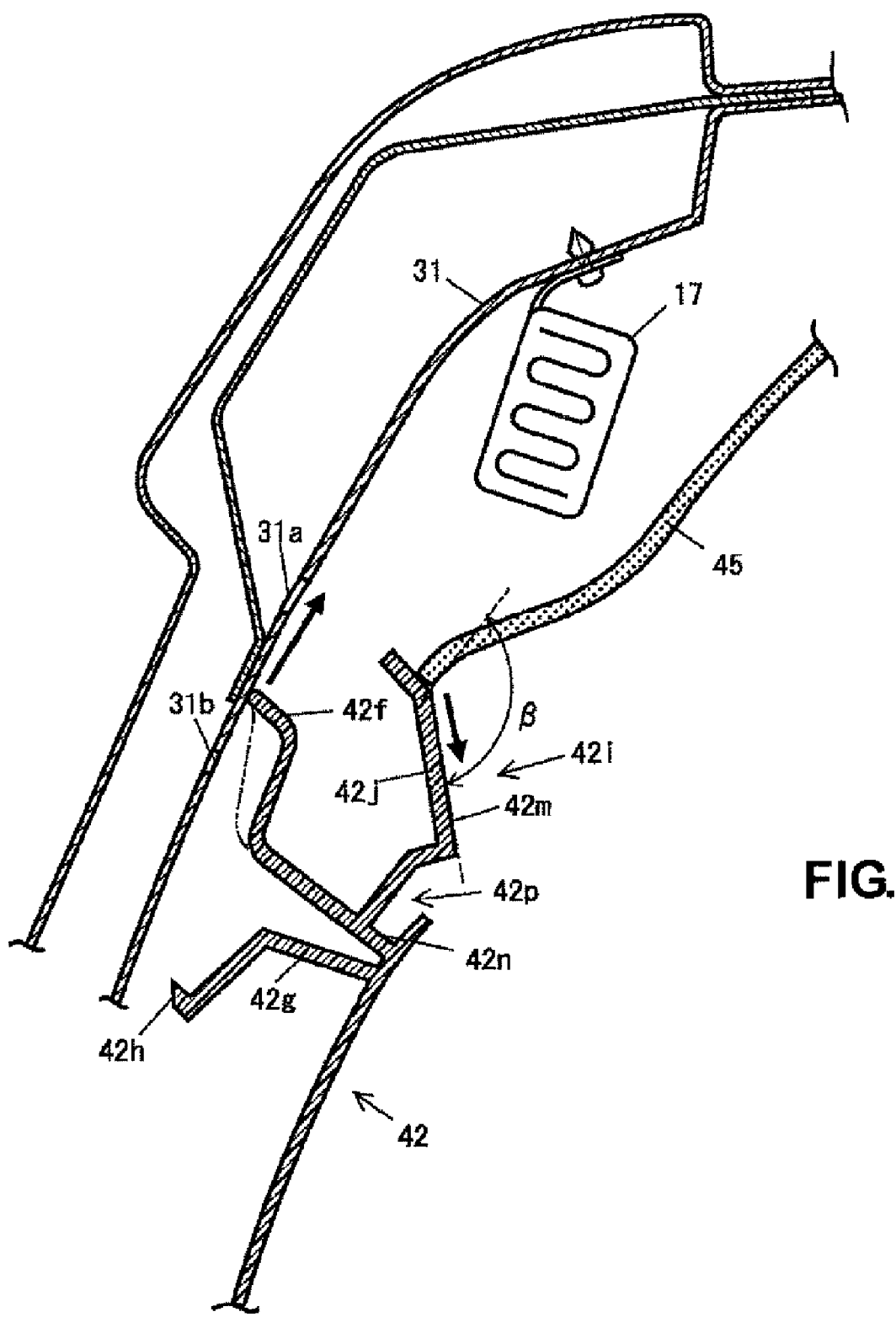
FIG. 10 is an explanatory diagram of an attachment of a C pillar, which corresponds to FIG. 6.

Herein, an attachment of the B pillar trim 42 will be described. As shown in FIG. 10, the B pillar trim 42 is attached to the inner face of the vehicle body by being made slide upward along this inner face. The guide face 42m of the guide portion 42j is configured to have an angle β of approximate 90 degrees or greater relative to the side end portion of the roof trim 45 so that the side end portion of the roof trim 45 can slide smoothly along the guide portion 42j toward the vehicle compartment side when the B pillar trim 42 is attached.

Figure 7:
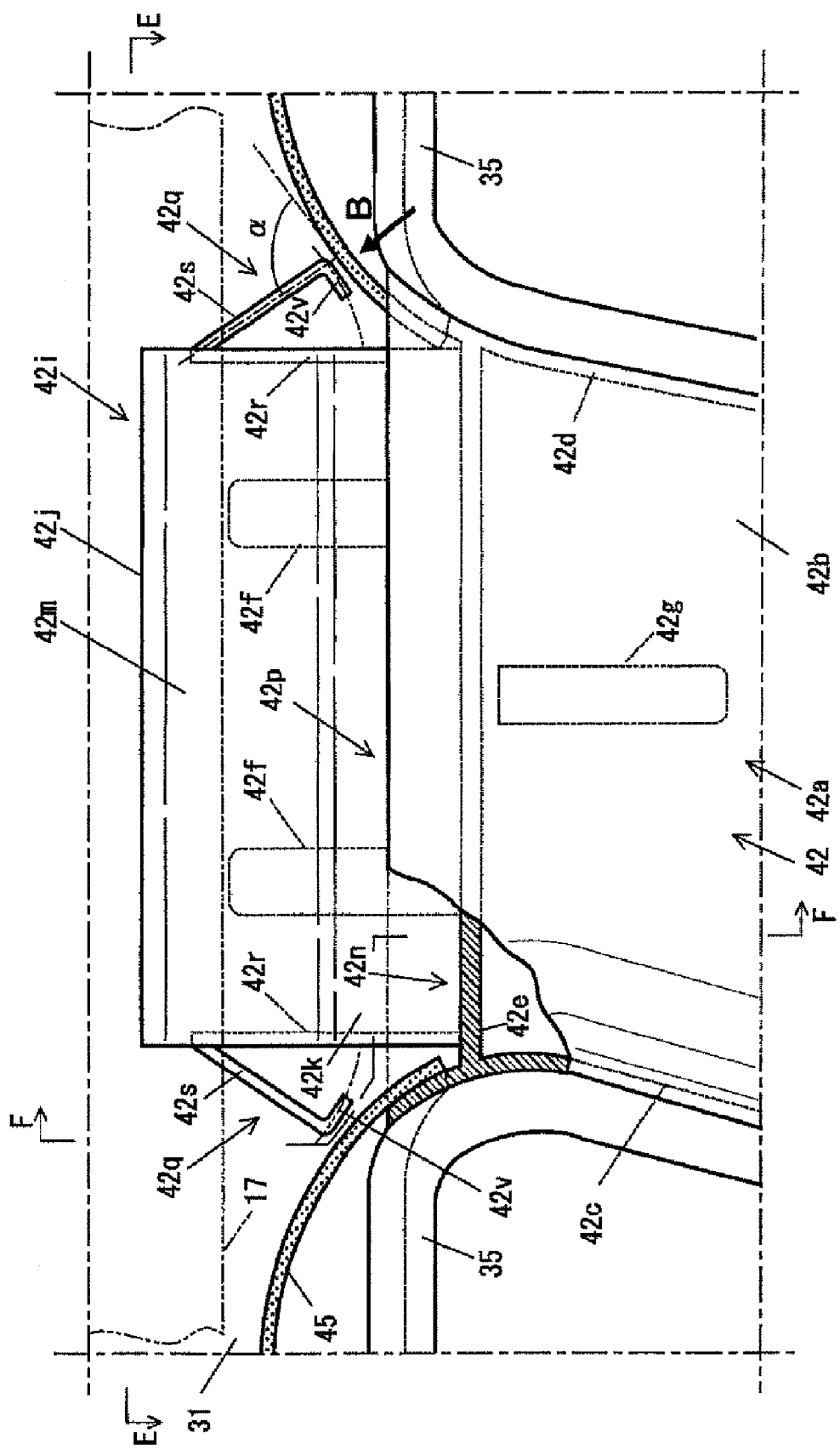
FIG. 7 is a side view, when viewed along an arrow D direction in FIG. 4.
Figure 9:
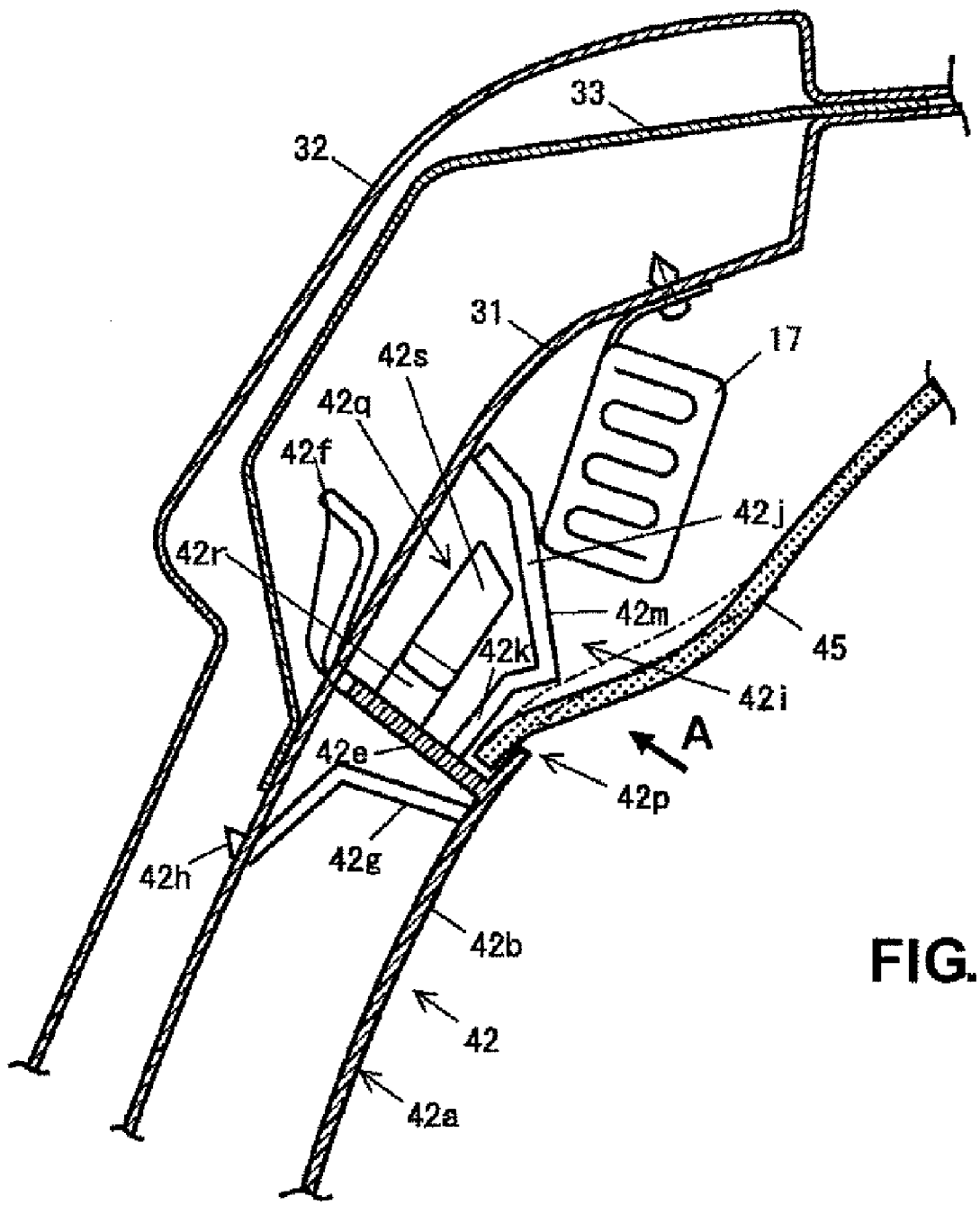
FIG. 9 is a sectional view of taken along line F-F of FIG. 7.

As shown in FIGS. 7-9, at the upper end of the B pillar trim 42 are provided restricting portions 42q, 42q to restrict an outward (toward the vehicle outside) movement of the roof trim 45.

The restricting portion 42q comprises a plate-shaped upright portion 42r that extends upward from the upper face of the cover-shaped portion 42e, a slant portion 42s that extends obliquely downward from an upper end of the upright portion 42r beyond a periphery of a notch portion 45a that is formed at the roof trim 45, a second slant portion 42v that extends from a lower end of the slant portion 42s toward the periphery of the notch portion 45a. The slant portion 42s may possibly guide the airbag 17 inflating toward the vehicle compartment side. The second slant portion 42v is provided to receive the roof trim 45 with face contacting when the roof trim 45 has been placed behind. Also, this also functions as a member to improve maintenance in that the B pillar trim 42 is drawn downward of the roof trim 45.

The restricting portion 42q is provided so as to project (extend) toward the vehicle compartment side beyond the periphery of the notch portion 45a of the roof trim 45 when the B pillar trim 42 is attached to the vehicle body, when viewed from the top.

Figure 11:
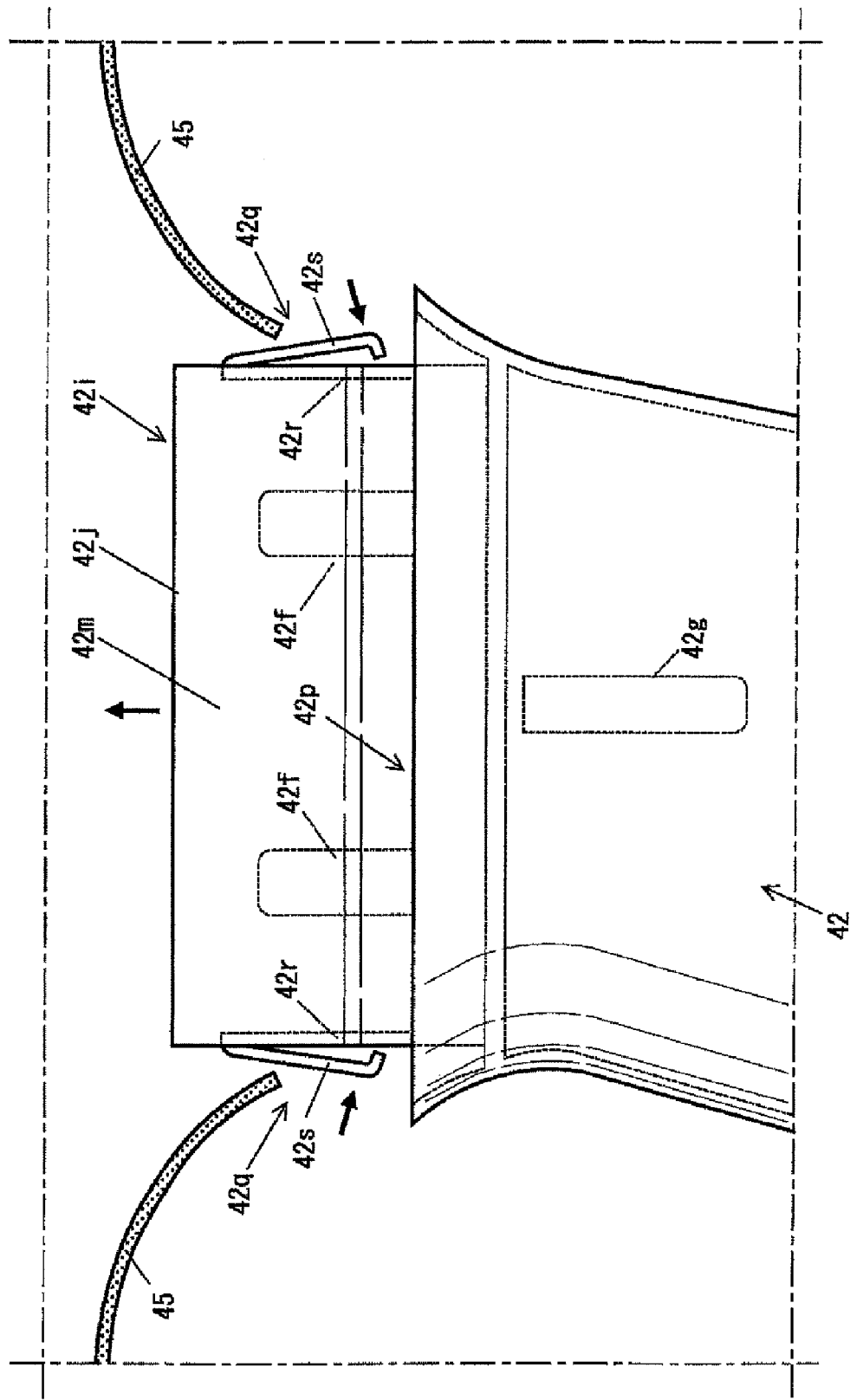
FIG. 11 is an explanatory diagram of an attachment of a C pillar, which corresponds to FIG. 7.

Further, the restricting portion 42q is made of resin and formed integrally with the body portion 42a. Thus, the slant portion 42s is longitudinally rotatable around the upper end of the upright portion 42r, and the roof trim 45 is positioned outside a rotational locus (shown by an one-dotted broken line in FIG. 7) of the slant portion 42s. Accordingly, when attaching the B pillar trim 42 from a location below the roof trim 45, as shown in FIG. 11, a longitudinal distance between both the slant portions 42s, 42s can be shortened by pushing them as shown, so that the amount of projection of the restring portion 42q toward the vehicle compartment side can be reduced properly.

Next, the inflation operation of the curtain airbag 17 will be described. When specified requirements, such as the vehicle side crash is detected or predicted, or the vehicle overturn is detected or predicted, are met, the inflator 18 is activated. inflatable gas (pressure) generated by the inflator 18 is supplied to the curtain airbag 17 via the supply passage 19, thereby inflating the curtain airbag 17 into the vehicle compartment as shown in FIG. 2.

Herein, the inflation of the curtain airbag 17 into the vehicle compartment at portions of the roof side portion 30 that do not correspond to the pillar portions is allowed by releasing the engagement of the side end portion of the roof trim 45 with the groove 35a of the weather strip 35. The side end portion of the roof trim 45 released from the groove 35a is so deformed easily because of its softness as to allow the airbag 17 to get out and inflate smoothly.

Figure 12:
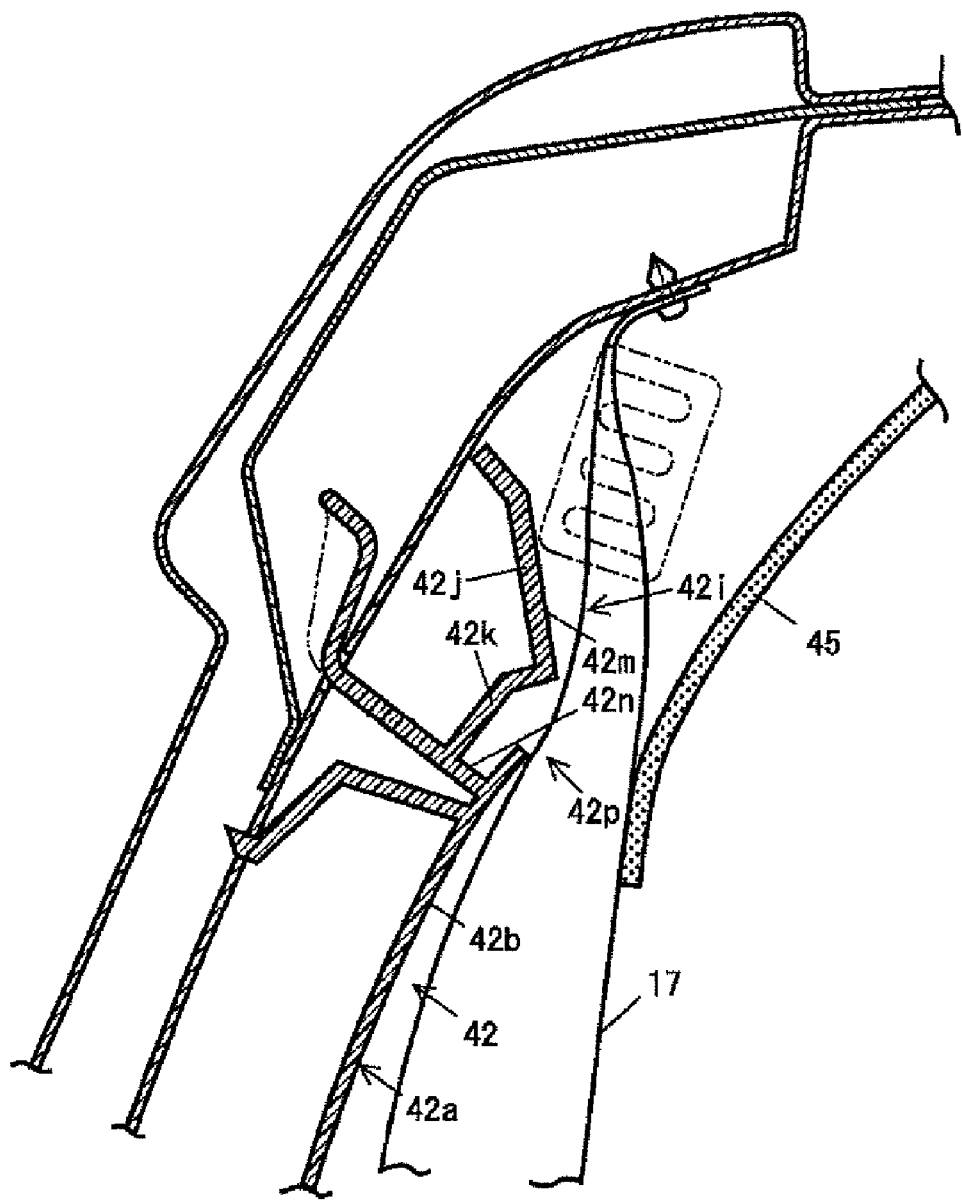
FIG. 12 is a diagram showing an inflation state of the curtain airbag, which corresponds to FIG. 6.

Meanwhile, at the roof side portion 30 near the upper end portion of the B pillar 10, as shown in FIG. 12, the side end portion (a peripheral portion of the notch portion 45a) of the roof trim 45 is released from the engagement with the groove of the engagement portion 42p and deformed toward the vehicle compartment side. Thereby, the inflation of the curtain airbag 17 into the vehicle compartment is conducted.

Next, the operation and effect of the guide portion 42i will be described.

Since the above-described guide portion 42j is provided so that its vehicle-compartment-side end portion is located behind and close to the roof trim 45, even if the passenger inadvertently pushes the roof trim 45 toward the vehicle outside as shown by an arrow A in FIG. 9, the roof trim 45 contacts with the vehicle-compartment-side end portion of the guide portion 42j as shown by an imaginary line. Accordingly, the roof trim 45 can be restrained from being deformed further, thereby preventing deterioration of appearances of the roof trim 45 and an improper influence to the inflation of the curtain airbag 17. While the vehicle-compartment-side end portion of the guide portion 42j is provided to be slightly away from the roof trim 45 originally as shown in FIG. 9 in the present embodiment, it may be located closer or contacted to the roof trim 45 in its original state.

Further, since the guide portion 42j is formed integrally with the B pillar trim 42, the number of parts can be reduced and the properly simple structure can be provided.

Also, since the engagement of the side end portion of the roof trim 45 with the portion 42p of the B pillar trim 42 at the lower portion of the guide portion 42j is releasable for the inflation of the curtain airbag 17, the side end portion of the roof trim 45 can be covered with the engagement portion 42p so as to provide a good appearance when the airbag 17 is in the non-inflation state, while the smooth inflation of the airbag 17 can be provided when the airbag 17 inflates.

Herein, since the engagement portion 42p includes the groove 42n extending along the upper edge of the body portion 42a of the B pillar trim 42 for the engagement with the side end portion of the roof trim 45, the releasing of this engagement can be facilitated. Accordingly, a burden of the curtain airbag 17 to push the roof trim 45 toward the vehicle-compartment side at the inflation of the airbag 17 can be properly reduced, thereby improving the airbag's inflation. Also, since the outside groove wall of the engagement portion 42p is formed by the lower portion of the connecting portion 42k, the upper structure of the B pillar trim 42 can be made properly simple.

Also, since the vehicle-compartment-side end portion of the guide portion 42j is located inward from the vehicle-compartment-side end of the engagement portion 42p, the side end portion of the roof trim 45 can be supported properly.

Further, since the guide face 42m of the guide portion 42j is configured to be slant and have the angle β of approximate 90 degrees or greater relative to the side end portion of the roof trim 45 for the case of the B pillar trim 42 being attached to the inner face of the vehicle body by being made slide upward along this inner face, the side end portion of the roof trim 45 can slide smoothly along the guide face 42m of the guide portion 42j to improve the attachment of the B pillar trim 42 without generating any improper bending of the side end portion of the roof trim 45. Also, this proper attachment can be attained without enlarging the notch portion 45a improperly.

Also, since the guide face 42m of the guide portion 42j is slant toward the vehicle compartment side as shown, the inflating airbag 17 can be guided toward the passenger properly.

Next, the operation and effect of the restricting portion 42q will be described.

Since at the upper end of the B pillar trim 42 is provided the restricting portion 42q to restrict the movement of the roof trim 45, even if the passenger inadvertently pushes the roof trim 45 that is on the front end side or the rear end side of the notch portion 45a toward the vehicle outside, the roof trim 45 contacts with the restricting portion 42q. Accordingly, the roof trim 45 can be restrained from being deformed further, thereby preventing deterioration of appearances of the roof trim 45 and the improper influence to the inflation of the curtain airbag 17.

Further, since the guide portion 42j to guide the airbag 17 inflating toward the vehicle compartment side is provided above the body portion 42a of the pillar trim 42, the inflation of the airbag 17 can be properly guided. Also, since at the lower portion of the guide portion 42j is provided the engagement portion 42p that is operative to engage with the side end portion of the roof trim 45 and this engagement is releasable for the inflation of the curtain airbag 17, the side end portion of the roof trim 45 can be covered with the engagement portion 42p so as to provide the good appearance when the airbag 17 is in the non-inflation state, while the smooth inflation of the airbag 17 can be provided when the airbag 17 inflates. Further, since the restricting portion 42q is formed integrally with the B pillar trim 42, the number of parts can be reduced and the properly simple structure can be provided.

And, the guide portion 42j is formed as part of the extending portion 42i that extends substantially upward from the upper end portion of the body portion 42a of the B pillar trim 42, and the restricting portion 42q is provided so as to project (extend) toward the vehicle compartment side beyond the periphery of the notch portion 45a of the roof trim 45 when the B pillar trim 42 is attached to the vehicle body. Accordingly, in the case where the passenger inadvertently pushes the roof trim 45 toward the vehicle outside, the roof trim 45 contacts with the this projection, thereby providing the above-described effect to a larger part area of the roof trim 45.

Further, the amount of the above-described projection of the restring portion 42q toward the vehicle compartment side can be reduced (reducible). Accordingly, the B pillar trim 42 can be properly attached to the B pillar body after attaching the roof trim 45 to the roof with the extending portion 42i engaging the notch portion 45a of the roof trim 45, without damaging the periphery of the notch portion 45a. This effect can be obtained when removing the B pillar trim 42 for the maintenance as well.

Moreover, since the restricting portion 42q comprises the upright portion 42r extending upward from the upper end portion of the body portion 42a of the pillar trim 42 and the slant portion 42s extending obliquely downward from the upper end of the upright portion 42r beyond the periphery of the notch portion 45a formed at the roof trim 45, the structure of the restricting portion 42q can be made simple and the smooth inflation of the airbag 17 can be attained.

Since the slant portion 42s is longitudinally rotatable around the upper end of the upright portion 42r and the roof trim 45 is positioned outside the rotational locus of the slant portion 42s, when the slant portion 42s rotates (swings) at the inflation of the airbag 17, it can be prevented from contacting the roof trim 45, and the roof trim 45 can be prevented from being stuck between the slant portion 42s and the upright portion 42r. Thus, the inflation of the airbag 17 does not deteriorate even if the restricting portion 42q is provided.

Also, in the present embodiment, as shown in FIG. 7, the front upper portion (an upper end of the front face portion 42c of the body portion 42a) of the B pillar trim 42 is formed in a greatly-curved shape, and the rear upper portion (an upper end of the rear face portion 42d of the body portion 42a) of the B pillar trim 42 is formed in a greatly-curved shape. This configuration may improve the design of the B pillar trim 42 with a more effective application of the present invention. Further, since this design provides the notch 45a of the roof trim 45 having a longitudinally elongated shape with a properly low rigidity, the inflation of the curtain airbag 17 can be improved.

Further, in the present embodiment, as shown in FIG. 7, an angle α between the restricting portion 42q and the root trim 45 is set to about 90 degrees. Accordingly, in a case where the roof trim 45 that is on the front end side or the rear end side of the notch portion 45a is pushed upward as shown by an arrow B, the structure of the present embodiment can provide a proper resistance effectively.

Also, since the restricting portions 42q are located below the front and rear end portions of the guide portion 42j, when the B pillar trim 42 is moved upward, the vehicle-outside end of the guide portion 42j contacts the restricting portions 42q, thereby preventing the guide portion 42j from being deformed further. Further, since the restricting portion 42q does not project upward beyond the guide face 42m, the inflation of the airbag 17 may not be obstructed.

Modifications of Extending Portion

Hereinafter, some modifications of the extending portion 42i including the guide portion 42j will be described. The same components/portions as the above-described embodiment are denoted by the same reference characters.

Figure 13:
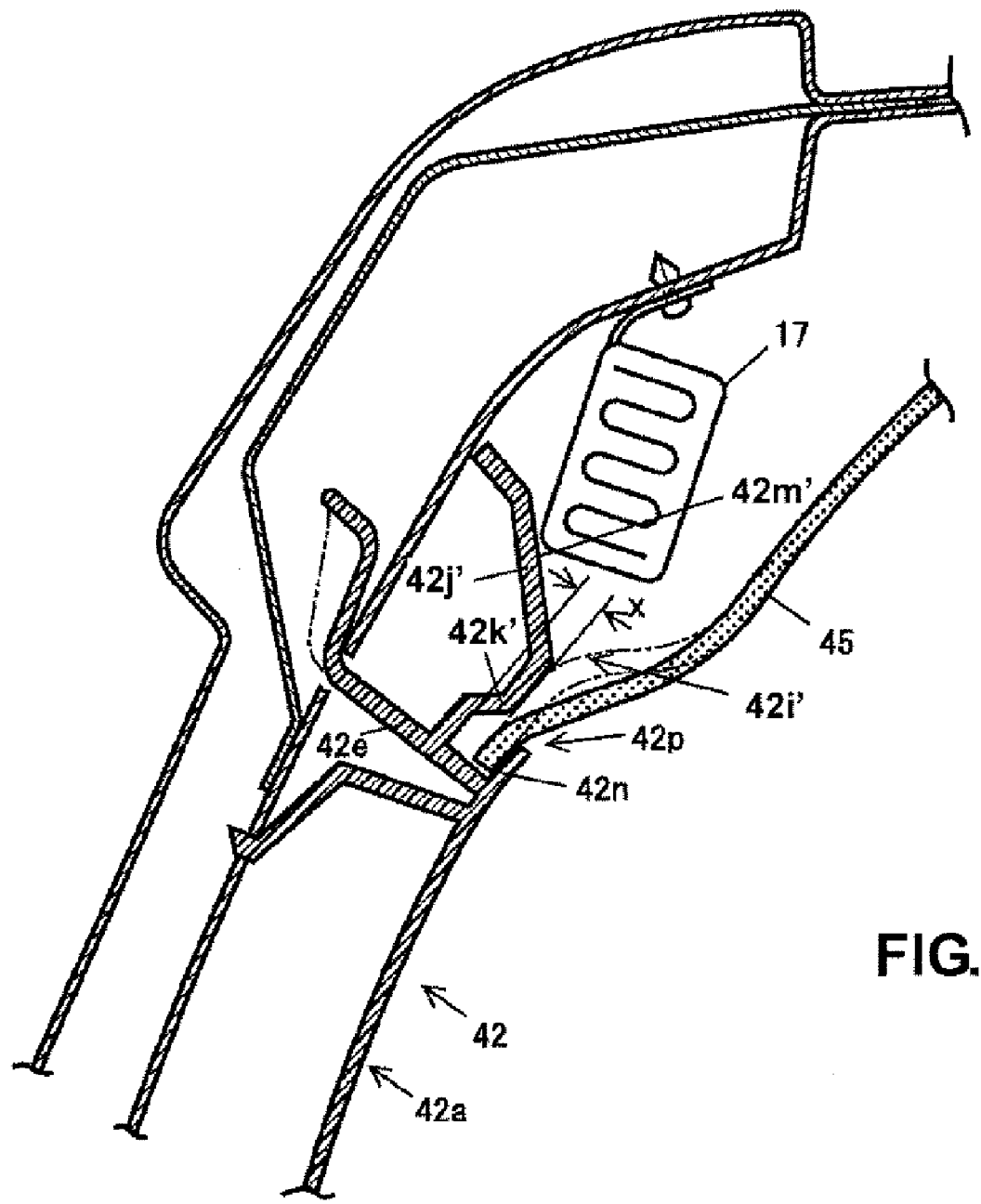
FIG. 13 is a view of an extending portion of a first modification, which corresponds to FIG. 6.

Initially, in an extending portion 42i' of a first modification shown in FIG. 13, an upper portion of a connecting portion 42k' is located at a lower level, and a portion below a guide portion 42j' is upright and longer. The vehicle-compartment-side end portion of the guide portion 42j' including a guide face 42m' is configured to project toward the vehicle compartment side (the roof trim 45) from the lower end of the connecting portion 42k' by a specified amount x. Accordingly, an contact area of the side end portion of the roof trim 45 that is pushed outward is enlarged.

Figure 14:
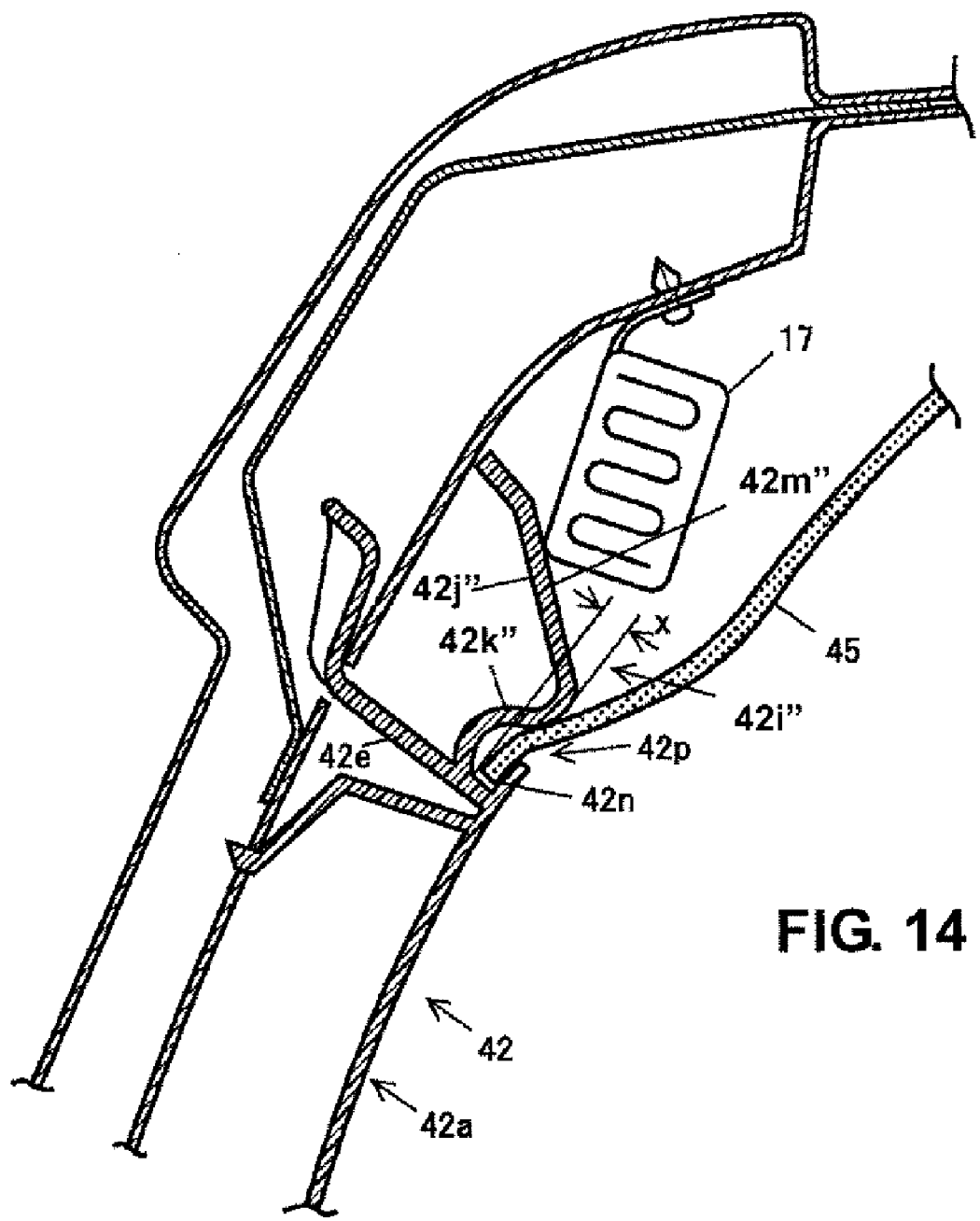
FIG. 14 is a view of an extending portion of a second modification, which corresponds to FIG. 6.

In an extending portion 42i" of a second modification shown in FIG. 14, the vehicle-compartment-side end portion of a guide portion 42j" is formed in an arc shape, and a connecting portion 42k" is also formed in an arc shape so as to & continuous from the vehicle-compartment-side end portion of the guide portion 42j". The vehicle-compartment-side end portion of the guide portion 42j" including a guide face 42m" is configured to project toward the vehicle compartment side (the roof trim 45) from the lower end of the connecting portion 42k" by a specified amount x. Accordingly, a contact area of the side end portion of the roof trim 45 that is pushed outward is enlarged compared to the above-described embodiment. Further, since a connecting portion between the vehicle-compartment-side end portion of the guide portion 42j"' and the connecting portion 42k" when the curtain airbag 17 inflates has the arc shape, a slide resistance between this connecting portion and the roof trim 45 is reduced. Thus, the roof trim 45 can be easily pushed toward the vehicle compartment side, thereby providing the smooth inflation of the airbag 17.

Figure 15:
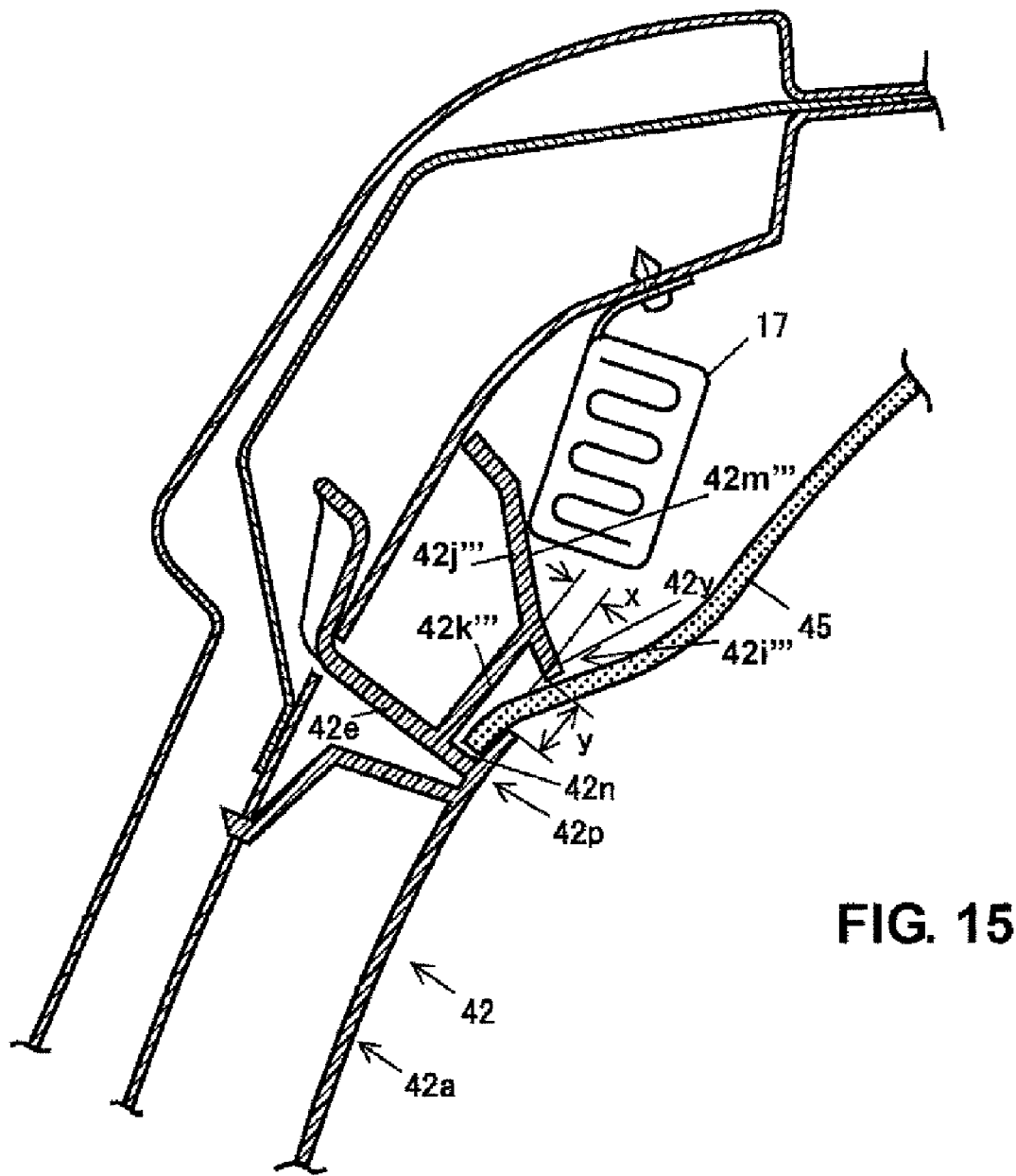
FIG. 15 is a view of an extending portion of a third modification, which corresponds to FIG. 6.

In an extending portion 42i'" of a third modification shown in FIG. 15, the vehicle-compartment-side end portion of a guide portion 42j'" has an extending portion 42y that extends toward the vehicle compartment side. The vehicle-compartment-side end portion of the guide portion 42j'" including a guide face 42m'" is configured to project toward the vehicle compartment side (the roof trim 45) from the lower end of the connecting portion 42k'" by a specified amount x. Accordingly, the side end portion of the roof trim 45 is supported at one point of a tip of the extending portion 42y. Thereby, the slide resistance between the vehicle-compartment-side end portion of the guide portion 42j'" and the roof trim 45 when the curtain airbag 17 inflates is reduced. Thus, the roof trim 45 can be easily pushed toward the vehicle compartment side, thereby providing the smooth inflation of the airbag 17.

Also, a distance y between the upper end of the body portion 42a of the B pillar trim 42 and an inner end of the extending portion 42y can be made larger. Thus, the side end portion of the roof trim 45 can be released easily from the engagement with the engagement portion 42p when the airbag 17 inflates.

Modifications of Restricting Portion

Hereinafter, some modifications of the restricting portion 42q will be described. The same components/portions as the above-described embodiment are denoted by the same reference characters.

Figure 16:
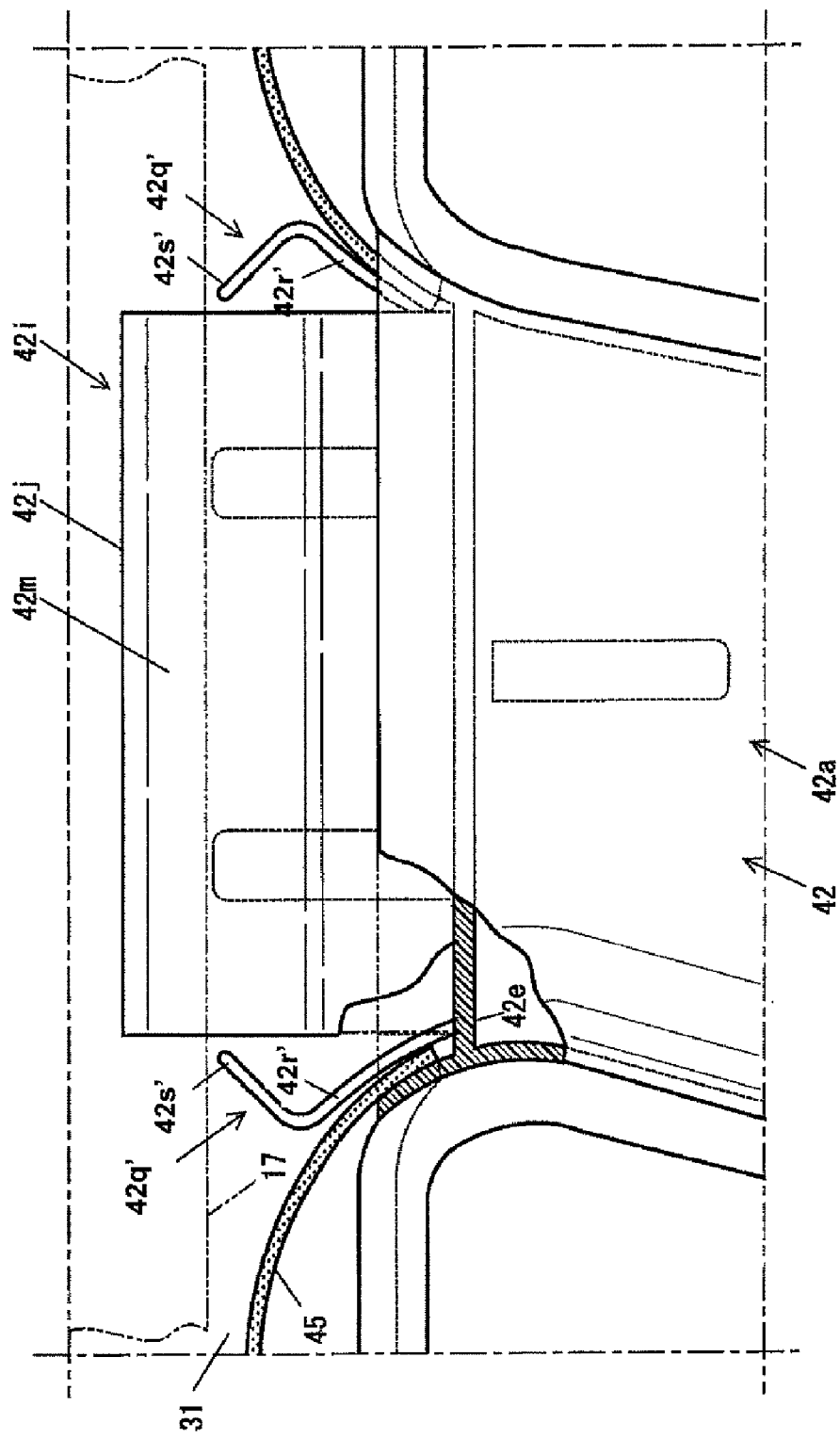
FIG. 16 is a view of a restricting portion of a first modification, which corresponds to FIG. 7.

Initially, a restricting portion 42q' of a first modification, as shown in FIG. 16, comprises a plate-shaped upright portion 42r' that extends obliquely upward from the upper face of the cover-shaped portion 42e along the side end portion of the roof trim 45 at the periphery of the notch portion 45a and a slant portion 42s' that extends obliquely upward from the upper end of the upright portion 42r'.

According to the above-described structure, the restricting portion 42q' can be made simple. Further, since it substantially extends obliquely upward along the side end portion of the roof trim 45, the support of the roof trim 45 at its side end portion can be improved.

Herein, the restricting portion 42q' is made of resin and formed integrally with the body portion 42a. Thus, the restricting portion 42q' is configured such that its whole part is longitudinally rotatable around a lower end of the upright portion 42r'.

According to the present modification, in addition to the basic effect of the restricting portion 42q' described above, by pushing the slant portions 42s' of the restricting portion 42q' toward the inside of the notch 45a of the root trim 45, the attachment of the B pillar trim 42 to the vehicle body or its maintenance can be properly conducted.

The above-described pushed restricting portion 42q' may return to its original position due to flexibility of the upright portion 42r' after the peripheral portion of the roof trim 45 near the notch portion 45a is placed behind the restricting portion 42q'.

Herein, since the slant portion 42s' of the restricting portion 42q' is formed in the slant shape as described above, it may function to guide the inflating curtain airbag 17 toward the vehicle compartment side.

Figure 17:
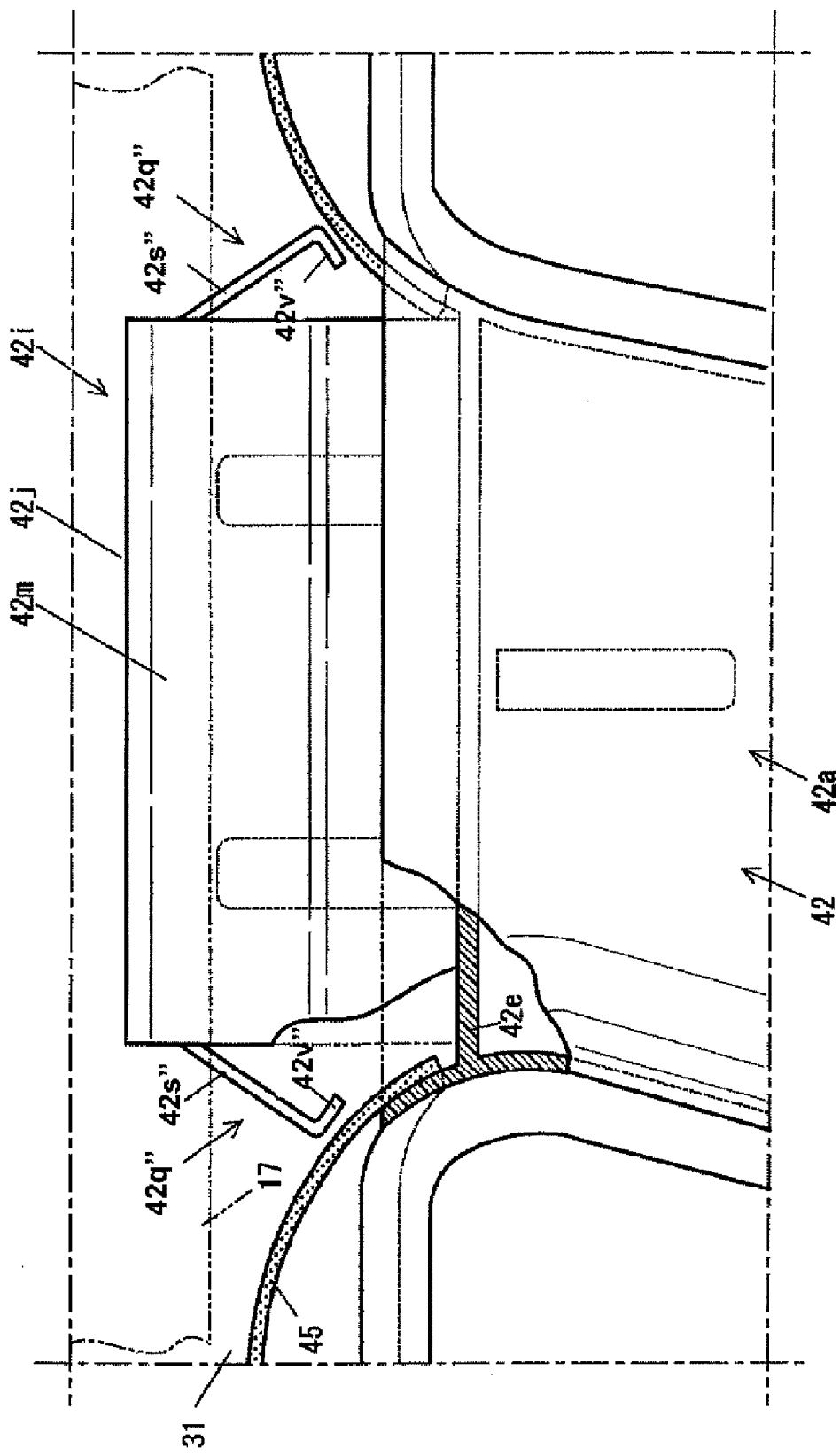
FIG. 17 is a view of a restricting portion of a second modification, which corresponds to FIG. 7.
Figure 18:
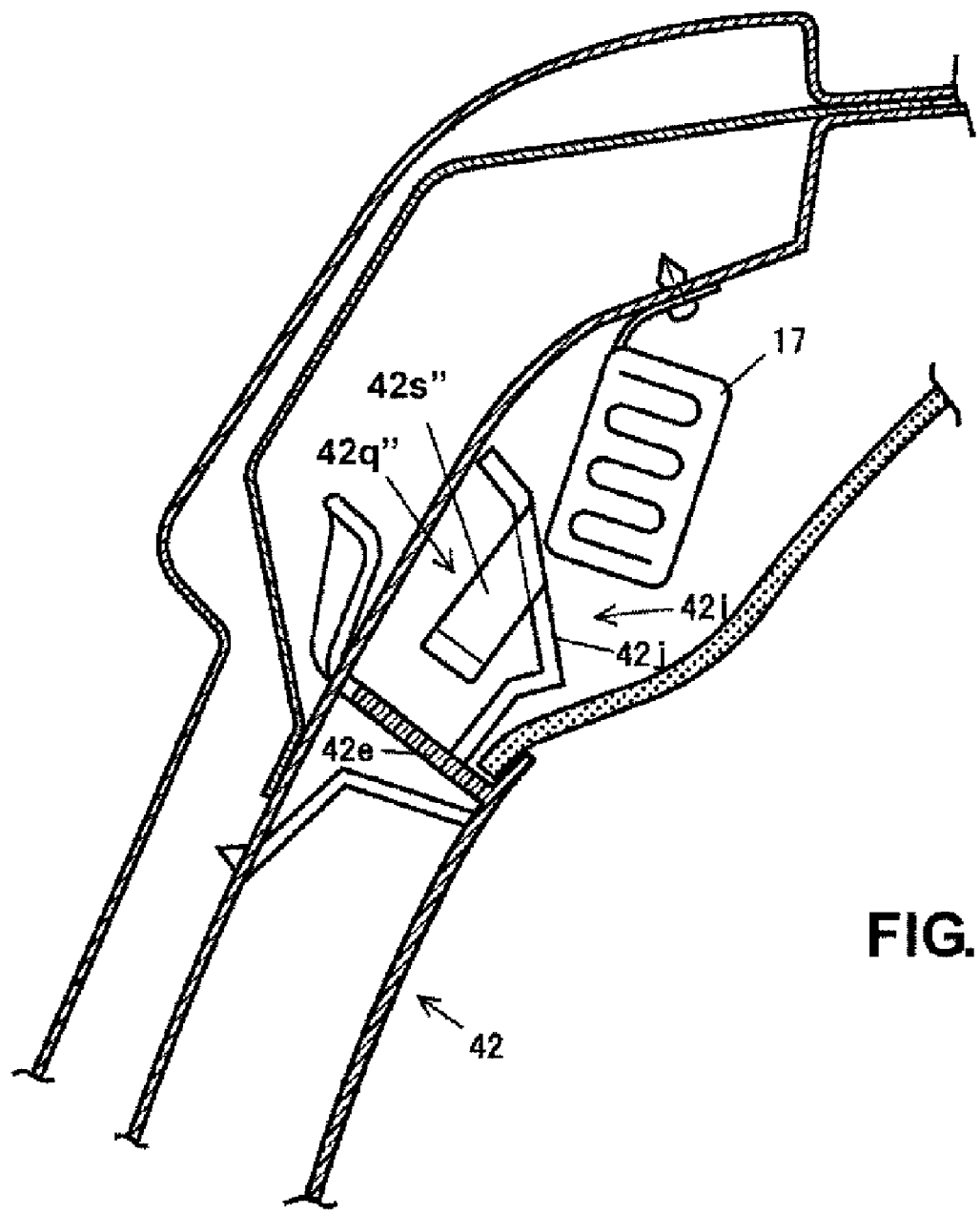
FIG. 18 is a view of the restricting portion of the second modification, which corresponds to FIG. 9.
Figure 19:
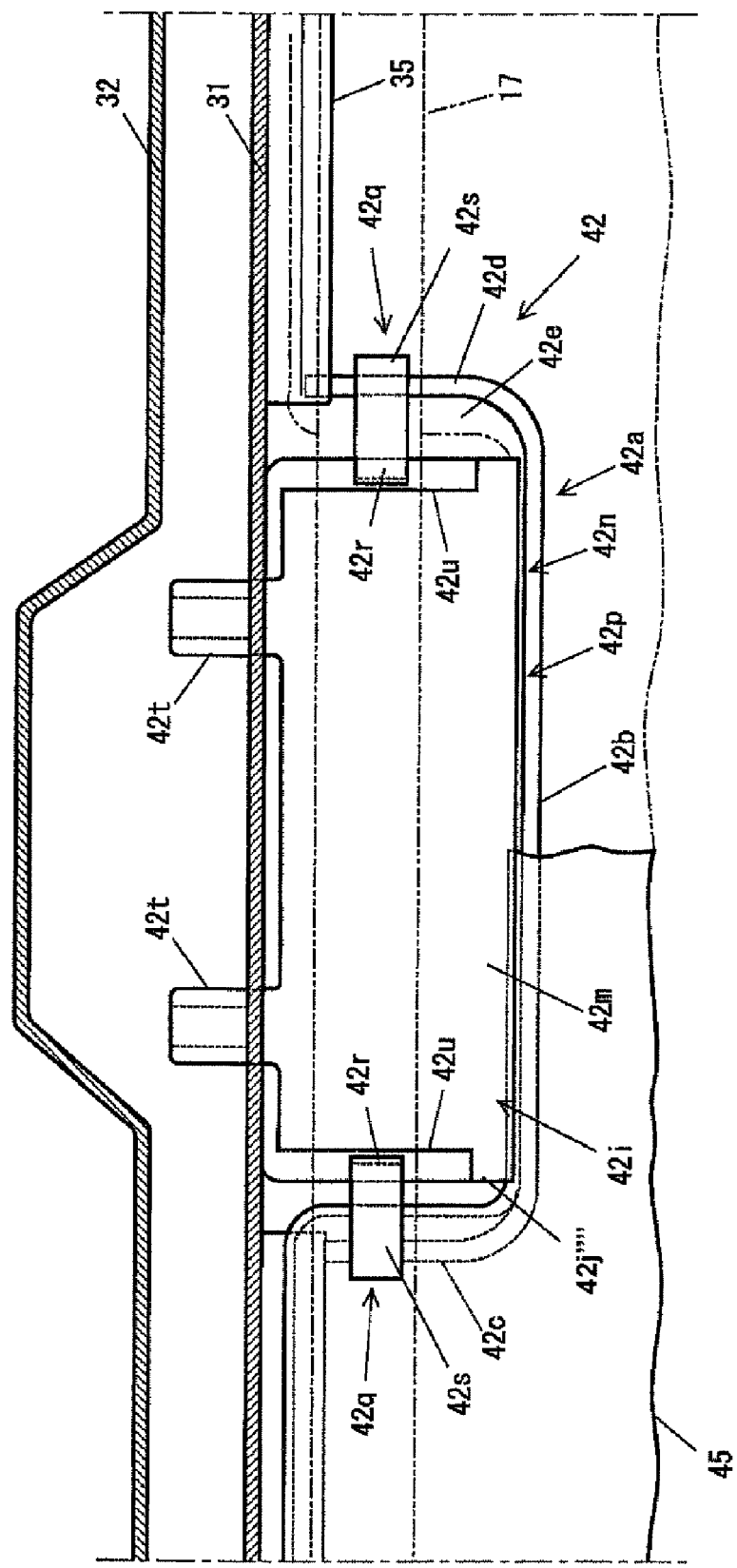
FIG. 19 is a view of a modified guide portion, which corresponds to FIG. 8.
Figure 20:
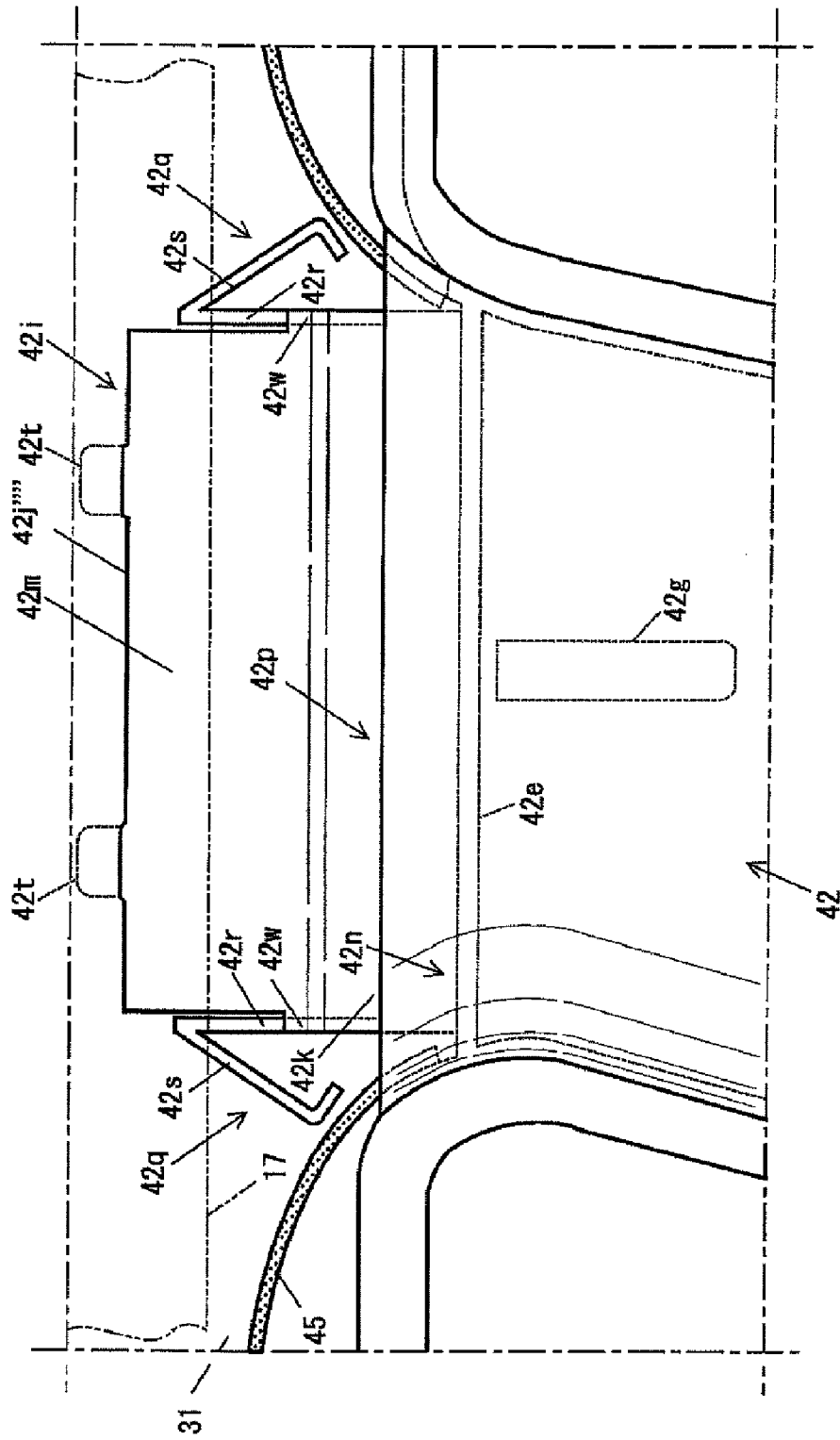
FIG. 20 is a view of the modified guide portion, which corresponds to FIG. 7.
Figure 21:
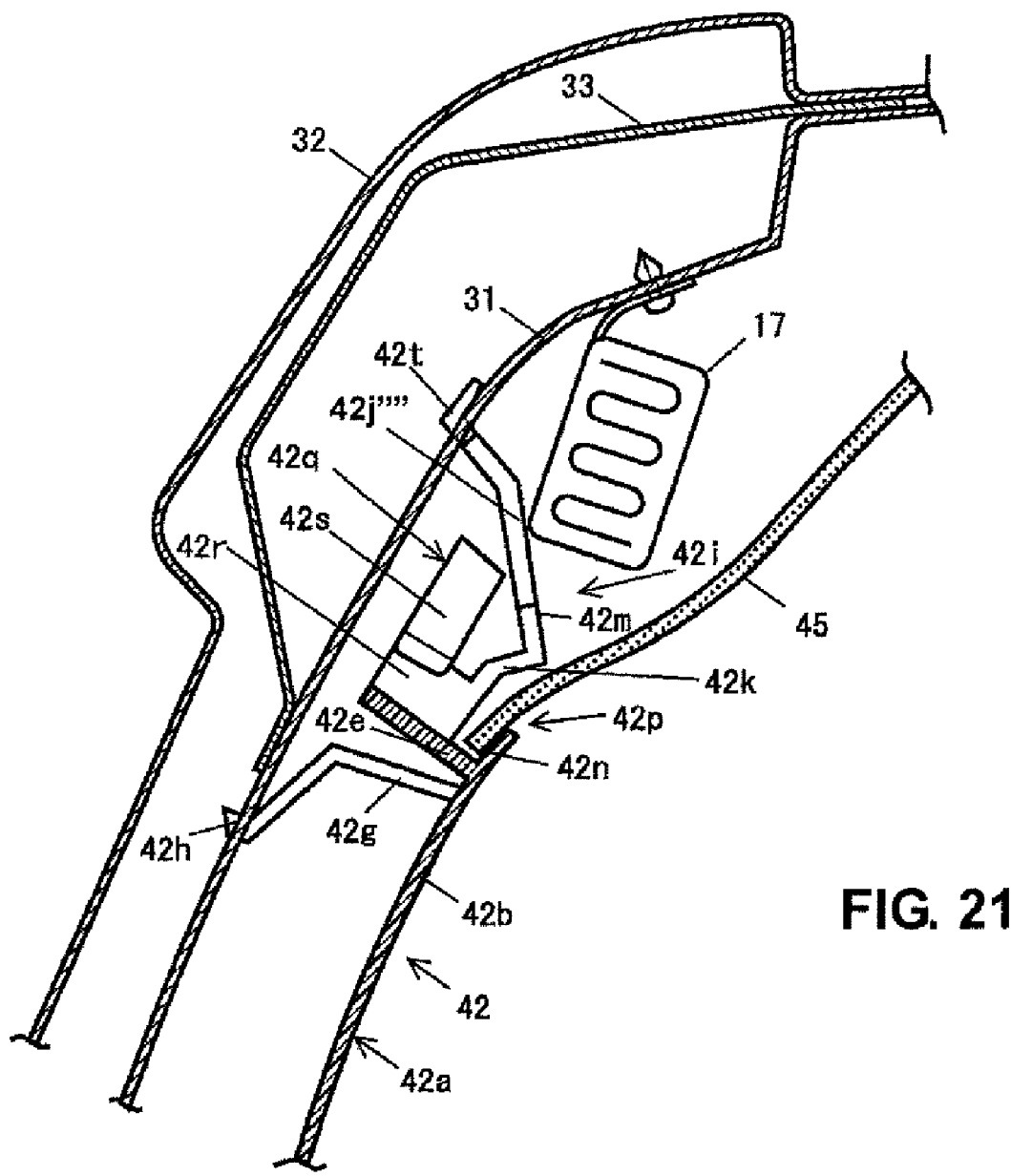
FIG. 21 is a view of the modified guide portion, which corresponds to FIG. 9.
Figure 22:
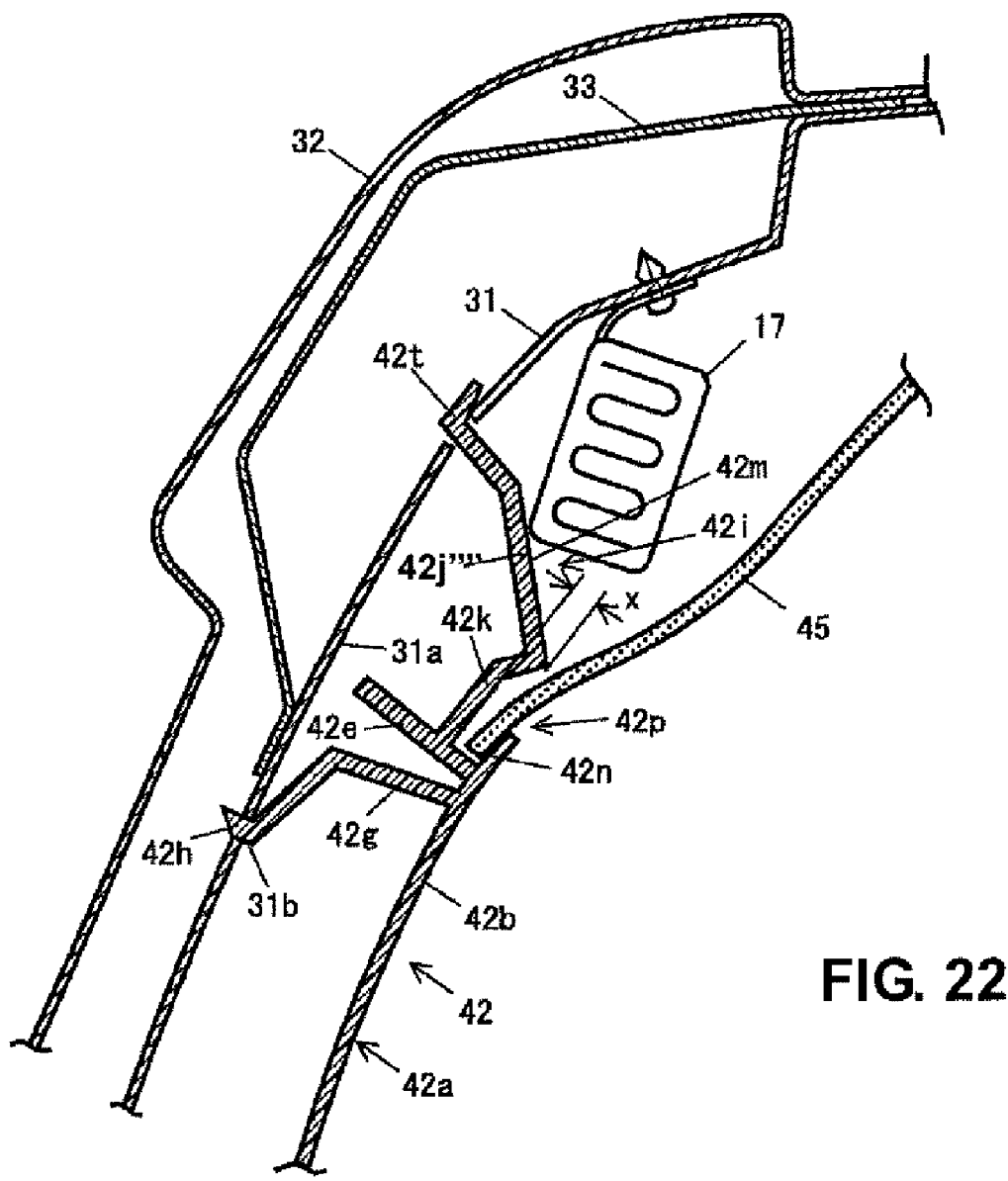
FIG. 22 is a view of the modified guide portion, which corresponds to FIG. 6.

A restricting portion 42q" of a second modification, as shown in FIGS. 17 and 18, is formed at the guide portion 42j. A plate-shaped slant portion 42s" of the restricting portion 42q" is configured to extend obliquely downward from the guide portion 42j as shown.

According to the present modification, the structure of the restricting portion 42q" can be made simpler. Likewise, the slant portion 42s" can guide the inflating curtain airbag 17 toward the vehicle compartment side, thereby improving the inflation of the airbag device 17.

The restricting portion 42q" is made of resin and formed integrally with the guide portion 42j, having flexibility, and slant portion 42s" is configured to be longitudinally rotatable around its upper end.

According to the present modification, in addition to the basic effect of the restricting portion 42q" described above, by pushing the slant portions 42s" of the restricting portion 42q" toward the inside of the notch 45a, the attachment of the B pillar trim 42 to the vehicle body or its maintenance can be properly conducted.

Instead of the above-described restricting portions, a restricting member, such as sponge or the like, may be provided at the upper end portion of the B pillar trim 42 so as to extend toward the vehicle compartment side beyond the peripheral edge of the notch potion 45a of the roof trim 45.

Modification of Guide Portion

Hereinafter, a further modification of the guide portion 42j will be described. The same components/portions as the above-described embodiment are denoted by the same reference characters.

A modified guide portion 42j"", as shown in FIGS. 19-22, includes two engaging leg portions 42t, 42t for attaching the B pillar trim 42 to the inner panel 31 of the B pillar 8 at its upper end portion. These engaging leg portions 42t, 42t are configured to be inserted into the engagement holes 31a, 31a that are formed at the inner panel 31. Namely, according to the present modification, the upper end portion of the guide portion 42j"" is fixed to the inner panel 31.

The guide portion 42j"" includes notches 42u, 42u at its portions that correspond to both the restricting portions respectively.

There is provided a lateral connecting portion 42w that connects the lower portion of the connecting portion 42k to the lower portion of the upright portion 42r of the restricting portion 42q.

The lower portion of the B pillar trim 42 is attached so as to be movable relative to the inner panel 31.

Figure 23:
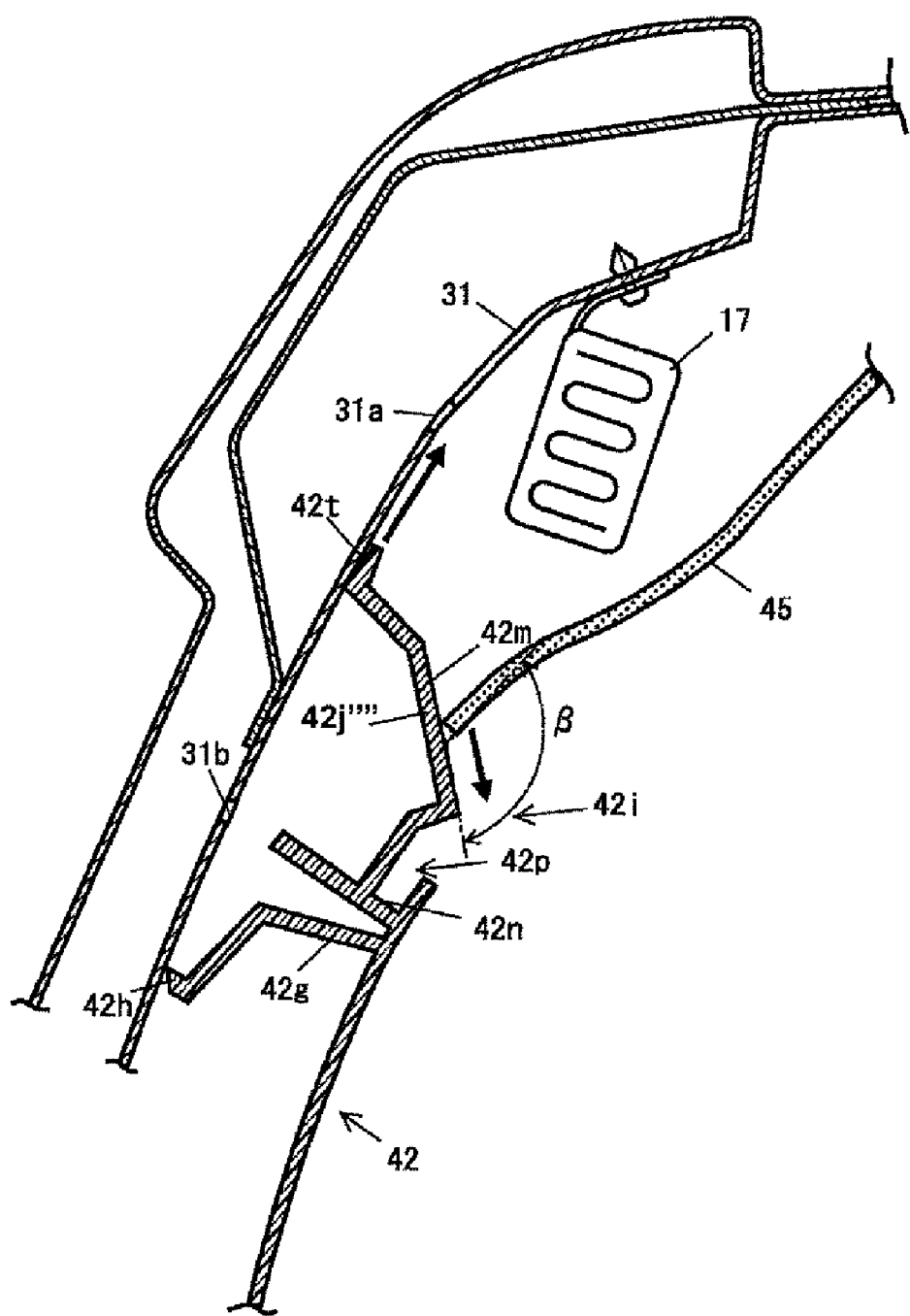
FIG. 23 is a view of the modified guide portion, which corresponds to FIG. 10.

According to the structure with the above-described modification of the guide portion 42j"" as shown in FIG. 23, when the B pillar trim 42 is attached, the side end portion of the roof trim 45 slides along the guide face 42m like the above-described embodiment, thereby preventing any improper deformation of the roof trim 45. Herein, since the guide face 42m is configured to have the angle β of approximate 90 degrees or greater relative to the side end portion of the roof trim 45, the same effect as that of the above-described embodiment can be provided.

Figure 24:
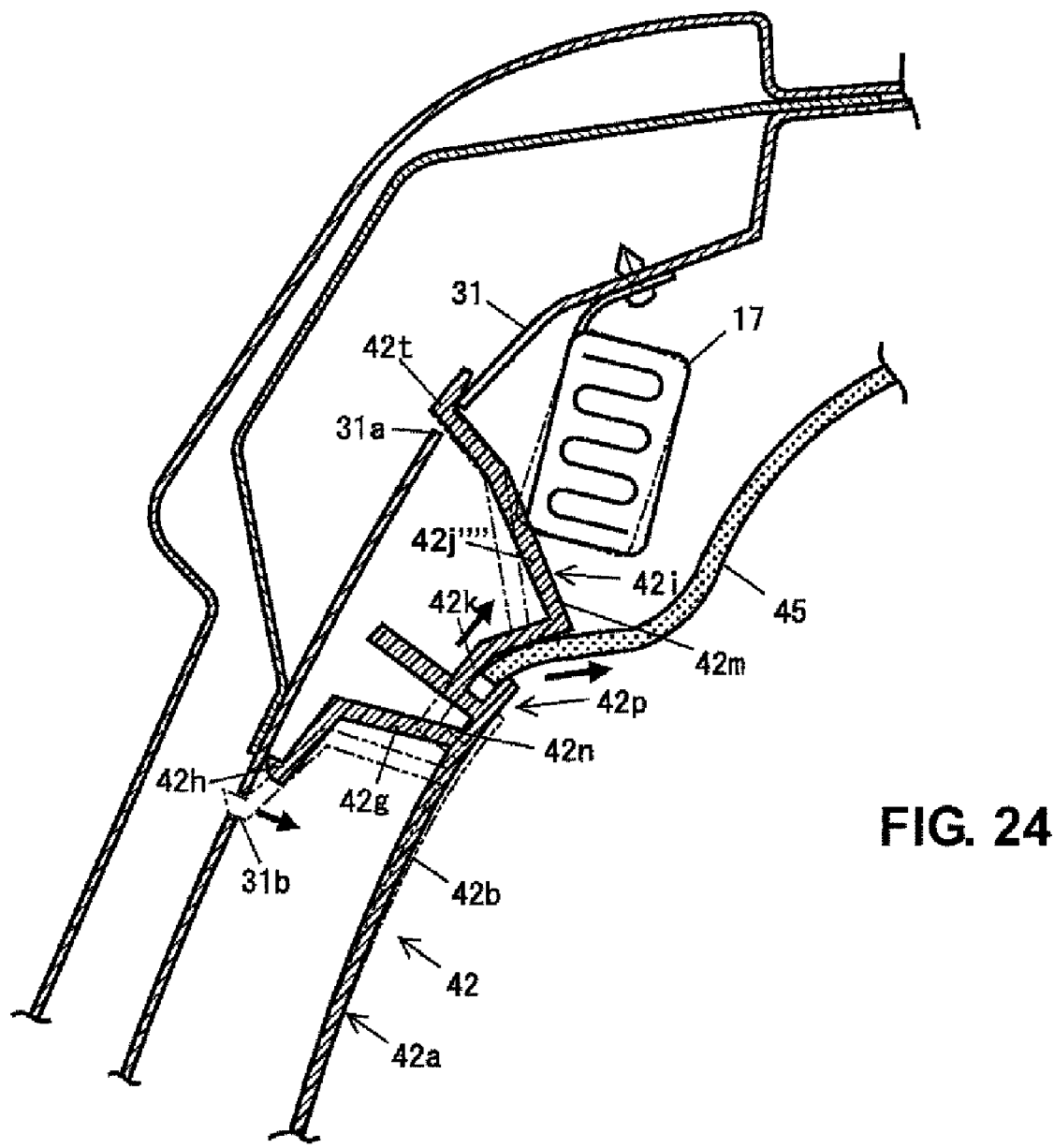
FIG. 24 is a view of the modified guide portion, which corresponds to FIG. 6, in a state just before an inflation of the airbag.
Figure 25:
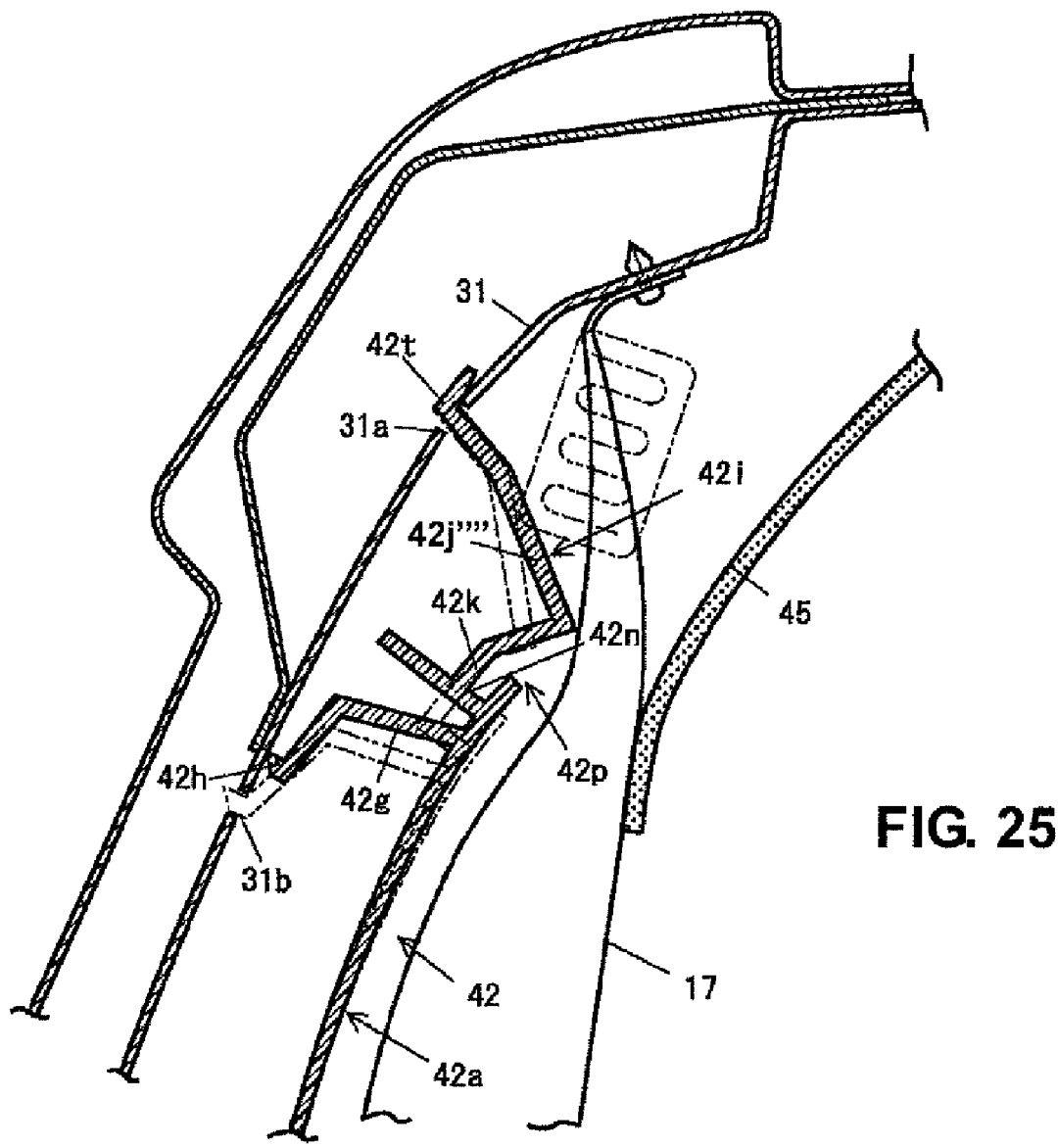
FIG. 25 is a view of the modified guide portion, which corresponds to FIG. 12.

As shown in FIG. 24, when the curtain airbag 17 inflates, namely when the B pillar trim 42 receives an impact load that causes the trim 42 to move toward the extending direction (substantially upward) of the B pillar 8 at the vehicle crash, the engagement of the engaging projection 42h with the engagement hole 31b is released and then the B pillar trim 42 moves upward relative to the pillar body. Herein, since the B pillar trim 42 is made of resin with the flexibility, the connecting portion 42k falls down toward the vehicle compartment side and the guide portion 42j"" moves toward the vehicle compartment side, thereby the end side portion of the roof trim 45 is pressed toward the vehicle compartment side by the vehicle-compartment-side end portion of the guide portion 42j"". Accordingly, the releasing of the side end portion of the roof trim 42 from the engagement portion 42p can be promoted, so the curtain airbag 17 can smoothly inflate out of the boundary between the upper end of the body portion 42a of the B pillar trim 42 and the side end portion of the roof trim 45 as shown in FIG. 25.

Herein, the connecting portion 42k is configured such that the vehicle-compartment-side end portion of the guide portion 42j"" is away from the upper end of the vehicle-compartment-side wall portion of the groove 42n of the engagement portion 42p even when the guide portion 42j"" is moved toward the vehicle compartment side. Thus, side end portion of the roof trim 45 can be prevented from being stuck between the vehicle-compartment-side end portion of the guide portion 42j"" and the upper end of the vehicle-compartment-side wall portion of the groove 42n of the engagement portion 42p when the curtain airbag 17 inflates. Namely, the inflation of the airbag 17 does not deteriorate.

Further, since the engagement portion 42p includes the groove 42n extending along the upper edge of the body portion 42a of the B pillar trim 42 for the engagement with the side end portion of the roof trim 45, the releasing of this engagement can be facilitated. Accordingly, the burden of the curtain airbag 17 to push the roof trim 45 toward the vehicle-compartment side at the inflation of the airbag 17 can be properly reduced, thereby improving the airbag inflation. Also, since the outside groove wall of the engagement portion 42p is formed by the lower portion of the connecting portion 42k, the upper structure of the B pillar trim 42 can be made properly simple.

Also, as shown in FIG. 24, the lower end of the airbag 17 is moved toward the vehicle compartment side from its position shown by an imaginary line to its another position shown by a solid line when the guide portion 42j"" is moved upward and toward the vehicle compartment side as described above. Namely, the inflation direction of airbag 17 is directed toward the vehicle compartment side. Thereby, the inflation of the airbag 17 can be further improved.

There may occur a gap between the side end portion of the roof trim 45 and a bottom of the groove 42n of the engagement portion 42p due to a dimensional error, heat shrinking or something. In this case, there may be a problem in that the side end portion of the roof trim 45 may not contact the bottom of the groove 42n, thereby preventing the smooth releasing from the engagement portion. According to the present modification, however the side end portion of the roof trim 45 can be pushed to attain the smooth releasing by the movement of the vehicle-compartment-side end portion of the guide portion 42j"". Thus, the proper inflation of the airbag 17 can be provided.

Also, since the guide portion 42j"" includes lateral connecting portions 42w, 42w as well as the notches 42u, 42u, the restricting portion 42q can project upward beyond the guide face 42m of the guide portion 42j"", so that the deformation of the guide portion 42j"" upward and toward the vehicle compartment side can be promoted.

Herein, it is not necessary to provide the notches 42u, 42u at the guide portion 42j"". In this case, the restricting portions 42q, 42q are located below the front and rear ends of the guide portion 42j"". Thereby, the deformation of the guide portion

42j''' is restrained, and it can be prevented that the inflation of the airbag 17 is deteriorated by the restricting portions 42q, 42q.

Also, the above-described modifications can be also applied to the present modification. In the modifications of the extending portion, there can be provided the operation and effects of the guide portion 42j'''' in that its vehicle-compartment-side end portion is deformed (moved) toward the vehicle compartment side when the B pillar trim 42 is moved upward with the impact load acting as shown in FIGS. 24 and 25.

While the guide portion, the restring portion (extending portion) are formed integrally with the B pillar trim in the above-described embodiment and modifications, the guide portion may be originally formed separately from the B pillar trim, and they may be fixed to each other via screws or clips.

The present invention can be widely applied to the vehicle with the curtain airbag that is operative to inflate out of the boundary between the pillar trim and the roof trim.

What is claimed is:

1. An interior structure of a vehicle equipped with a curtain airbag device, comprising:
    a pillar trim;
    a roof trim;
    a curtain airbag operative to inflate out of a boundary between said pillar trim and said roof trim so as to cover a window of the vehicle when a specified requirement is met; and
    a restricting portion provided at an upper end portion of said pillar trim behind said roof trim so as to restrict a movement of said roof trim,
    wherein near said boundary at an upper end portion of a body portion of the pillar trim is provided a guide portion operative to guide said airbag inflating toward a vehicle compartment side, below a vehicle-compartment-side end portion of the guide portion is provided an engagement portion to accept a side end portion of the roof trim for engagement, whose engagement with the side end portion of the roof trim being releasable when the airbag inflates, and said restricting portion is provided so as to extend from the guide portion or the engagement portion.

2. The interior structure of a vehicle equipped with a curtain airbag device of claim 1, wherein said restricting portion is provided so as to project beyond a periphery of a notch portion that is formed at said roof trim when the pillar trim is attached to a vehicle body in such a manner that the upper end potion of the pillar trim is covered, and an amount of projection of the restring portion toward the vehicle compartment side is reducible.

3. The interior structure of a vehicle equipped with a curtain airbag device of claim 2, wherein said restricting portion comprises an upright portion that extends obliquely upward from the upper end portion of the body portion of the pillar trim beyond the notch portion substantially along the side end portion of the roof trim and a slant portion that extends obliquely upward from an upper end of the upright portion.

4. The interior structure of a vehicle equipped with a curtain airbag device of claim 1, wherein said restricting portion is formed at said guide portion to be slant downward such that said guide portion can guide the airbag toward the vehicle compartment side.

5. The interior structure of a vehicle equipped with a curtain airbag device of claim 1, wherein a plurality of said restricting portions are provided at front and rear sides of said upper end portion of the body portion of the pillar trim.

6. An interior structure of a vehicle equipped with a curtain airbag device, comprising:
    a pillar trim;
    a roof trim;
    a curtain airbag operative to inflate out of a boundary between said pillar trim and said roof trim so as to cover a window of the vehicle when a specified requirement is met; and
    a restricting portion provided at an upper end portion of said pillar trim behind said roof trim so as to restrict a movement of said roof trim,
    wherein said restricting portion comprises an upright portion that extends upward from the upper portion of a body portion of said pillar trim and a slant portion that extends obliquely downward from an upper end of the upright portion beyond a periphery of a notch portion that is formed at the roof trim.

7. The interior structure of a vehicle equipped with a curtain airbag device of claim 6, wherein said slant portion is configured to be longitudinally rotatable around an upper end thereof, and the roof trim is positioned outside a rotational locus of the slant portion.

8. An interior structure of a vehicle equipped with a curtain airbag device, comprising:
    a pillar trim;
    a roof trim;
    a curtain airbag operative to inflate out of a boundary between said pillar trim and said roof trim so as to cover a window of the vehicle when a specified requirement is met; and
    a restricting portion provided at an upper end portion of said pillar trim behind said roof trim so as to restrict a movement of said roof trim,
    wherein near said boundary at an upper end portion of a body portion of the pillar trim is provided a guide portion operative to guide said airbag inflating toward a vehicle compartment side, and the guide portion is provided behind said roof trim such that a vehicle-compartment-side end portion thereof is located close to the roof trim.

9. The interior structure of a vehicle equipped with a curtain airbag device of claim 8, wherein below a vehicle-compartment-side end portion of the guide portion at the pillar trim is provided an engagement portion to accept a side end portion of the roof trim for engagement, whose engagement with the side end portion of the roof trim being releasable when the airbag inflates.

10. The interior structure of a vehicle equipped with a curtain airbag device of claim 9, wherein said guide portion is provided above the body portion of the pillar trim via a connecting portion that is configured to fall down toward the vehicle compartment side such that the guide portion moves toward the vehicle compartment side when the airbag inflates.

11. The interior structure of a vehicle equipped with a curtain airbag device of claim 10, wherein said engagement portion includes a groove that is formed with an upper opening thereof to extend along an upper edge of the body portion of the pillar trim for the engagement with the side end portion of the roof trim, and an outside groove wall of the engagement portion is formed by a lower portion of said connecting portion.

12. The interior structure of a vehicle equipped with a curtain airbag device of claim 11, wherein said connecting portion is configured such that a vehicle-compartment-side end portion of the guide portion is away from an upper end of a vehicle-compartment-side wall portion of the groove of the engagement portion even when the guide portion is moved toward the vehicle compartment side.

13. The interior structure of a vehicle equipped with a curtain airbag device of claim 9, wherein the vehicle-compartment-side end portion of said guide portion is located inward from a vehicle-compartment-side end of the engagement portion.

14. The interior structure of a vehicle equipped with a curtain airbag device of claim 8, wherein the vehicle-compartment-side end portion of said guide portion has an extending portion that extends toward the vehicle compartment side.

15. The interior structure of a vehicle equipped with a curtain airbag device of claim 8, wherein said pillar trim is configured to be attached to an inner face of a vehicle body by being made slide upward along the inner face, and a guide face of said guide portion is configured to be slant and have an angle of approximate 90 degrees or greater relative to the side end portion of said roof trim.

* * * * *